(12) United States Patent
Zhang et al.

(10) Patent No.: US 9,388,869 B2
(45) Date of Patent: Jul. 12, 2016

(54) DISK BRAKE

(71) Applicant: HITACHI AUTOMOTIVE SYSTEMS, LTD., Ibaraki (JP)

(72) Inventors: Xuesheng Zhang, MinamiALPS (CN); Shigeru Hayashi, MinamiALPS (JP); Yohei Araki, MinamiALPS (JP); Nobuhiro Wakabayashi, MinamiALPS (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/303,906

(22) Filed: Jun. 13, 2014

(65) Prior Publication Data

US 2015/0001011 A1    Jan. 1, 2015

(30) Foreign Application Priority Data

Jun. 28, 2013   (JP) .................................. 2013-136627
Mar. 24, 2014   (JP) .................................. 2014-060595

(51) Int. Cl.
*F16D 65/097*      (2006.01)
*F16D 65/12*       (2006.01)

(52) U.S. Cl.
CPC ............. *F16D 65/12* (2013.01); *F16D 65/0972* (2013.01); *F16D 65/0978* (2013.01); *F16D 65/0979* (2013.01)

(58) Field of Classification Search
CPC .............. F16D 65/097; F16D 65/0977; F16D 65/0978; F16D 65/0979
USPC ............................................. 188/72.3, 73.38
See application file for complete search history.

(56) References Cited

U.S. PATENT DOCUMENTS

| | | | | |
|---|---|---|---|---|
| 5,033,590 A | * | 7/1991 | Kobayashi | F16D 66/02 188/1.11 W |
| 5,934,417 A | * | 8/1999 | Kobayashi | F16D 55/227 188/1.11 W |
| 5,947,233 A | * | 9/1999 | Kobayashi | F16D 55/227 188/1.11 W |
| 6,920,965 B2 | * | 7/2005 | Burgdorf | F16D 656/097 188/344 |
| 7,040,464 B1 | * | 5/2006 | Andrews | F16D 65/0978 188/73.38 |
| 7,086,506 B2 | * | 8/2006 | Wemple | F16D 65/0977 188/73.38 |
| 7,455,153 B2 | * | 11/2008 | Ooshima | F16D 65/0972 188/18 A |
| 8,376,092 B2 | * | 2/2013 | Lethorn | F16D 65/0972 188/72.3 |
| 8,540,060 B2 | * | 9/2013 | Hayashi | F16D 65/097 188/1.11 W |
| 8,684,148 B2 | * | 4/2014 | Wakabayashi | F16D 65/0972 188/73.36 |
| 8,869,950 B2 | * | 10/2014 | Maehara | F16D 55/227 188/73.38 |

(Continued)

FOREIGN PATENT DOCUMENTS

JP     2010-169149     8/2010

*Primary Examiner* — Thomas Irvin
(74) *Attorney, Agent, or Firm* — Wenderoth, Lind & Ponack, L.L.P.

(57) ABSTRACT

A return spring is provided between a friction pad and a mount member. The return spring biases the friction pad in a return direction for separating the friction pad from the disk, and is made of a metallic plate. The return spring includes a fixation portion on a proximal end side thereof, and the fixation portion is fixed to an ear portion of a back plate of the friction pad. The return spring includes an abutment portion, and the abutment portion is in elastic abutment with an abutment plate portion of a pad spring, which corresponds to a mount member side, on an outer side in a disk radial direction relative to the fixation portion. The pad spring includes a guide portion extending in a disk axial direction and supporting a side surface of an intermediate portion of the return spring.

19 Claims, 14 Drawing Sheets

(56) References Cited

U.S. PATENT DOCUMENTS

| | | | |
|---|---|---|---|
| 2005/0236236 A1* | 10/2005 | Farooq | F16D 65/0974 188/73.31 |
| 2007/0246312 A1* | 10/2007 | Bach | F16D 65/0972 188/73.31 |
| 2010/0187050 A1 | 7/2010 | Hayashi et al. | |
| 2011/0056778 A1* | 3/2011 | Roth | F16D 65/0973 188/234 |
| 2013/0025981 A1* | 1/2013 | Maehara | F16D 55/227 188/72.3 |
| 2014/0367208 A1* | 12/2014 | Miyake | F16D 55/227 188/72.3 |
| 2015/0247542 A1* | 9/2015 | Yukumi | F16D 65/0977 188/72.3 |

* cited by examiner

DISK BRAKE

BACKGROUND OF THE INVENTION

1. Technical Field

The present invention relates to a disk brake configured to apply a braking force to a vehicle such as an automobile.

2. Description of the Related Art

Generally, a disk brake mounted on a vehicle such as an automobile includes a mount member fixed to a non-rotatable portion of the vehicle and formed so as to extend over an outer circumferential side of a disk, a caliper provided on the mount member movably in an axial direction of the disk, a pair of friction pads movably installed on the mount member and configured to be pressed against both surfaces of the disk by the caliper, and return springs provided between the friction pads and the mount member to bias the friction pads in return directions for separating the friction pads from the disk and made of metallic plates (for example, refer to Japanese Patent Application Public Disclosure No. 2010-169149).

When a brake operation is performed by a driver of the vehicle or the like, for example, a piston provided in the caliper is slidably displaced toward the disk side by external hydraulic supply to thereby press the friction pads toward the disk, by which a braking force is applied to the disk. On the other hand, when the brake operation is released, the hydraulic pressure in the caliper is reduced so that the piston is displaced into the caliper and the friction pads are returned to return positions away from the disk by the return springs.

SUMMARY OF THE INVENTION

According to the technique discussed in the above-described patent literature, Japanese Patent Application Public Disclosure No. 2010-169149, the return spring is configured in such a manner that a distal end side thereof is in elastic abutment with the mount member side on an inner side in a disk radial direction relative to a proximal end side thereof fixed to a back plate of the friction pad. In this case, the biasing force of the return spring tends to place the friction pad into such a posture at the return position that an outer side of the friction pad in the disk radial direction is inclined toward the disk, leading to a possibility of easy occurrence of a drag phenomenon between this portion and the disk.

As a possible solution thereto, some consideration has been given to a configuration that allows the distal end side of the return spring to elastically abut against the mount member side on the outer side in the disk radial direction relative to the proximal end side fixed to the back plate of the friction pad. According to this configuration, the distal end side may be easily displaced from a desired abutment position depending on the abutment position of the distal end side of the return spring. Therefore, manufacturing the disk brake may become cumbersome and complicated.

The present invention has been contrived in consideration of the above-described problems with the conventional technique, and an object of the present invention is to provide a disk brake that allows a distal end side of a return spring to be easily disposed at a desired position to thereby improve manufacturing efficiency.

To achieve the above-described object, according to one aspect of the present invention, a disk brake includes a mount member configured to be fixed to a non-rotatable portion of a vehicle and formed so as to extend over an outer circumferential side of a disk, a caliper disposed on the mount member so as to be movable in an axial direction of the disk, a pair of friction pads movably provided on the mount member and configured to be pressed against both surfaces of the disk by the caliper, a pad spring provided on the mount member and disposed between the mount member and the pair of friction pads, a return spring disposed between the friction pad and the mount member and configured to bias the friction pad in a return direction for separating the friction pad from the disk, and a guide portion supporting a side surface of the return spring. The return spring includes a proximal end side portion and a distal end side portion, and the return spring is configured in such a manner that the proximal end side portion is fixed to a back plate of the friction pad and the distal end side portion is in elastic abutment with the mount member side on an outer side in a disk radial direction relative to the proximal end side portion.

According to the present invention, it is possible to improve the manufacturing efficiency of the disk brake.

DETAILED DESCRIPTION OF THE INVENTION

Figure 1:
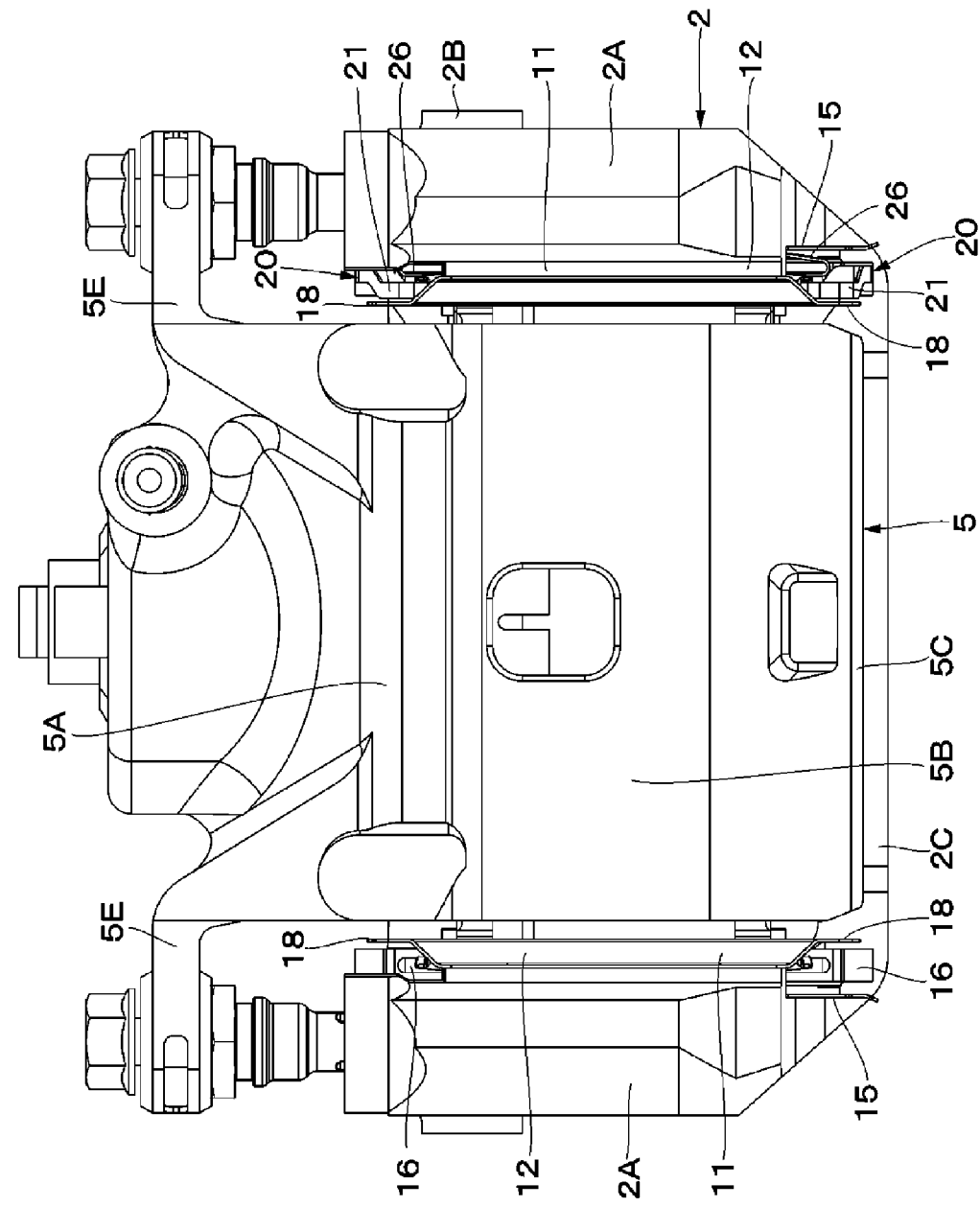
FIG. 1 is a plane view of a disk brake according to a first embodiment as viewed from an outer side in a disk radial direction.

Hereinafter, disk brakes according to embodiments of the present invention will be described in detail with reference to the accompanying drawings.

FIGS. 1 to 13 illustrate a first embodiment. A disk 1 (refer to FIGS. 2 and 3), which is configured to rotate together with a vehicle wheel (not illustrated), for example, rotates in a direction indicated by an arrow A (refer to FIGS. 2 and 3) when a vehicle runs forward, and rotates in a direction indicated by an arrow B (refer to FIGS. 2 and 3) when the vehicle runs backward.

A mount member 2 referred to as a carrier is fixed to a non-rotatable portion (not illustrated) of the vehicle, and is formed so as to extend over an outer circumferential side of the disk 1. The mount member 2 generally includes a pair of arm portions 2A and 2A, a support portion 2B, and a reinforcement beam 2C. The respective arm portions 2A and 2A are spaced apart from each other in a rotational direction of the disk 1 (the left-right direction in FIGS. 2 and 3; in the present disclosure, hereinafter referred to as a disk rotational direction, a disk tangential direction, or a disk circumferential direction), and extend in an axial direction of the disk 1 (the front-back direction in FIGS. 2 and 3; in the present disclosure, hereinafter referred to as a disk axial direction) so as to extend over an outer circumference of the disk 1.

The support portion 2B is provided so as to integrally connect proximal end sides of the respective arm portions 2A to each other, and is fixed to the non-rotatable portion of the vehicle at a position on an inner side of the disk 1. The reinforcement beam 2C couples distal end sides of the respective arm portions 2A to each other at a position on an outer side of the disk 1. As a result, the respective arm portions 2A of the mount member 2 are integrally coupled to each other by the support portion 2B on the inner side of the disk 1, and are integrally coupled to each other by the reinforcement beam 2C on the outer side of the disk 1.

A disk path portion (not illustrated), which arcuately extends along the outer circumference (a rotational locus) of the disk 1, is formed at intermediate portions of the respective arm portions 2A of the mount member 2 in the disk axial direction. Inner-side and outer-side pad guides 3 and 3 are formed on both sides of the disk path portion (both sides in the disk axial direction) in the mount member 2, respectively.

In other words, the pad guides 3 and 3 as support portions are formed on the inner side and the outer side at disk circumferential portions (both sides in the disk circumferential direction) of the mount member 2, respectively. These respective pad guides 3 and 3 are formed in such a manner that cross-sectional surfaces of the pad guides 3 and 3 in parallel with the disk 1 are shaped into rectangular recessed grooves opened at surfaces facing each other, and extend in a direction of a sliding displacement of friction pads 6, which will be described below, i.e., in the disk axial direction.

The respective pad guides 3 serve to guide the friction pads 6 in the disk axial direction via ear portions 7B and 7C of back plates 7 included in the friction pads 6. Therefore, the ear portions 7B and 7C of the friction pads 6 (the back plates 7) are fittedly inserted in the respective pad guides 3 (establish recess-protrusion fitting therebetween) so as to be sandwiched in a radial direction of the disk 1 (the vertical direction in FIGS. 2 and 3; in the present disclosure, hereinafter referred to as a disk radial direction).

Wall surfaces of the respective pad guides 3 on bottom sides form torque receiving surfaces 4 as so-called torque receiving portions. The torque receiving surfaces 4 bear braking torques that the friction pads 6 receive from the disk 1 when a brake operation is performed, via the ear portions 7B and 7C of the friction pads 6 and guide plate portions 15 of pad springs 11, which will be described below.

A caliper 5 is disposed on the mount member 2 so as to be movable in the disk axial direction. The caliper 5 includes an inner leg portion 5A, a bridge portion 5B, and an outer leg portion 5C. The inner leg portion 5A is located on the inner side, which is one axial side of the disk 1. The bridge portion 5B extends from the inner leg portion 5A to the outer side, which is another axial side of the disk 1, so as to straddle over the outer circumferential side of the disk 1 between the respective arm portions 2A of the mount member 2. The outer leg portion 5C extends inwardly in the disk radial direction from an outer side of the bridge portion 5B, which corresponds to a distal end side of the bridge portion 5B, and has a two-pronged distal end side as a claw portion.

For example, a single cylinder (not illustrated) serving as a single bore is formed at the inner leg portion 5A of the caliper 5. A piston 5 (refer to FIG. 2) is slidably fittedly inserted in this cylinder. As illustrated in FIGS. 1 and 3, a pair of mount portions 5E and 5E protruding in the disk rotational direction are integrally formed at the inner leg portion 5A. These respective mount portions 5E and 5E slidably support the entire caliper 5 to the respective arm portions 2A of the mount member 2 via sliding pins (not illustrated).

The inner-side and outer-side friction pads 6 and 6 are disposed so as to face surfaces of the disk 1 on the both sides in the disk axial direction. The respective friction pads 6 and 6 are installed on the mount member 2 so as to be movable in the disk axial direction, and are pressed against the both surfaces of the disk 1 by the caliper 5. As illustrated in FIGS. 7 to 10, each of the friction pads 6 and 6 generally includes the flat back plate 7 extending in the disk rotational direction, and a lining 8 joined (fixedly attached) to a disk facing surface 7A as one of surfaces of the back plate 7 and serving as a friction material in frictional contact with the surface of the disk 1 (a side surface in the axial direction). The back plate 7 can be made from a metal, resin, and the like.

The back plate 7 of the friction pad 6 includes the ear portions 7B and 7C as fitting portions respectively protruding at side edges on the both sides in the disk circumferential direction. These respective ear portions 7B and 7C are slidably fittedly inserted in the pad guides 3 of the mount member 2 via the respective guide plate portions 15 of the pad springs 11, which will be described below, respectively. Then, the respective ear portions 7B and 7C serve as torque transmission portions configured to transmit the braking torque that the friction pad 6 receives from the disk 1 when the vehicle is braked to the torque receiving surfaces 4 of the mount member 2 (via the pad springs 11).

Figure 8:
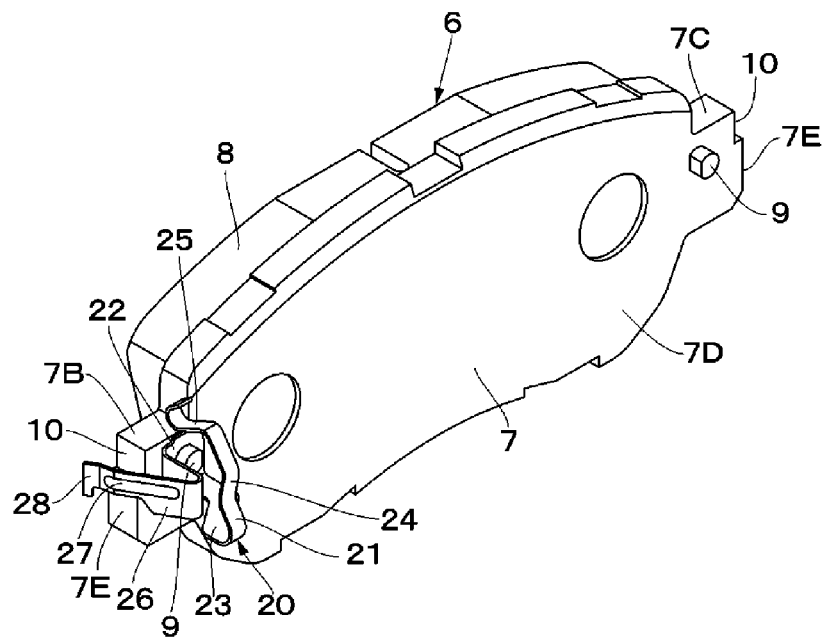
FIG. 8 is a perspective view of the inner-side friction pad and the spring structure extracted from FIG. 7, as viewed from the same direction as FIG. 7.
Figure 9:
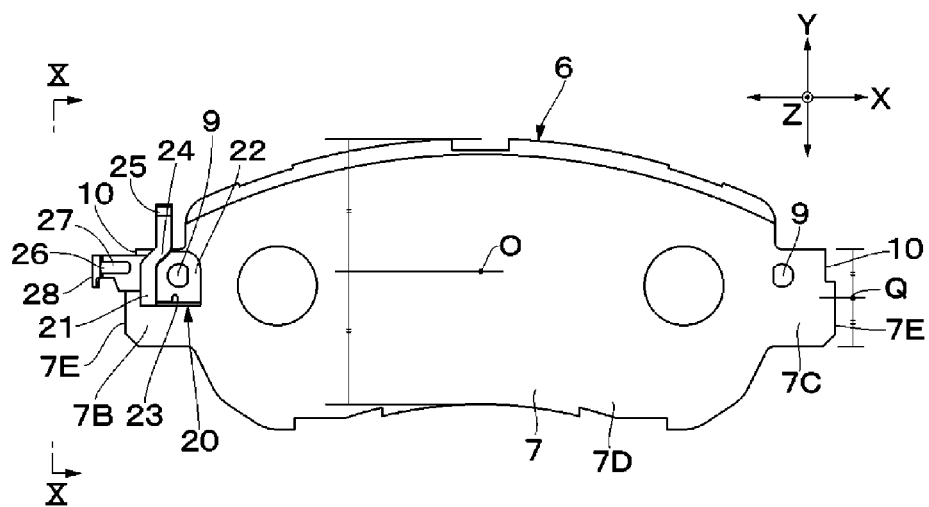
FIG. 9 is a back view of the inner-side friction pad and the spring structure as viewed from the inner side.
Figure 10:
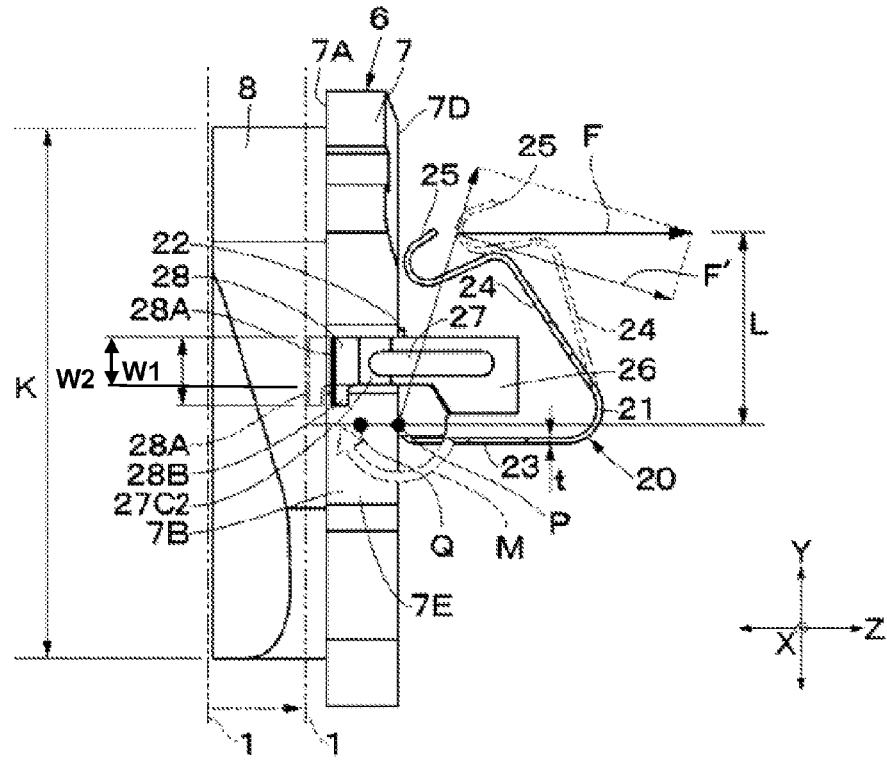
FIG. 10 is a side view of the inner side friction pad and the spring structure as viewed from a direction indicated by arrows X-X illustrated in FIG. 9.

As illustrated in, for example, FIG. 9, the ear portions 7B and 7C of the friction pad 6 (the back plate 7) are bilaterally symmetrically formed, and have identical shapes to each other. FIGS. 8 to 10 illustrate the inner-side friction pad 6. The ear portion 7B, which is one (the left one in FIG. 9) of the ear portions, is located on an entrance side (a leading edge side) in the rotational direction with respect to the disk 1 rotating in the direction indicated by the arrow A when the vehicle is running forward. The ear portion 7C, which is the other (the right one in FIG. 9) of the ear portions, is located on an exist side (a trailing edge side) in the rotational direction with respect to the disk 1. A spring structure 20 including a return spring 21, which will be described below, is attached to the ear portion 7B, which is the one of the ear portions 7B and 7C that is located on the leading edge side of the disk 1. In the present embodiment, the spring structure 20 is provided only on the leading edge side of the disk 1, and is not provided on the trailing edge side of the disk 1. However, the spring structure 20 may be also provided on the trailing edge side, if necessary.

Protrusions 9 and 9 are formed on the back plate 7 of the friction pad 7 at positions near proximal end sides (base sides) of the ear portions 7B and 7C, respectively. These protrusions 9 are formed so as to protrude from a back surface 7D (a surface opposite from the disk facing surface 7A attached to the lining 8, a back surface) of the back plate 7, and are formed into non-circular shapes (partially cut-out circles) in cross-section. One of the protrusions 9 that is located on the leading edge side of the disk 1 is used to position the spring structure 20, which will be described below, relative to the back plate 7. In other words, a swaging hole 22A of the spring structure 20 is engaged with the one protrusion 9 (coupled by swaging).

Stepped portions 10 and 10 are formed on surfaces 7E of the ear portions 7B and 7C of the back plate 7 that face the torque receiving surfaces 4 of the pad guides 3, respectively. These stepped portions 10 and 10 are formed by partially cutting the facing surfaces 7E, which are end surfaces of the ear portions 7B and 7C on distal end sides (protruding sides) thereof, into L shapes. The respective stepped portions 10 are formed at radially outer positions relative to central positions (refer to a point Q in FIG. 9) of the ear portions 7B and 7C in width directions thereof (the disk radial direction).

One of the stepped portions 10 that is located on the leading edge side of the disk 1 provides a containing space for containing a part of a side push spring 26 integrally formed with the return spring 21, which will be described below. The side push spring 26 is disposed on this stepped portion 10 so as to extend in the disk axial direction. In this case, a part (a protrusion portion 28B) of a vibration portion 28, which is a distal end of the side push spring 26, enters between the disk facing surface 7A of the back plate 7 and the disk 1. In the present embodiment, the distal end of the side push spring 26 is also used as a function of detecting wear of the lining 8, whereby the distal end of the side push spring 26 extends as far as between the disk facing surface 7A and the disk 1. However, if the distal end of the side push spring 26 is not used as the function of detecting wear of the lining 8, this does not necessarily have to extend as far as between the disk facing surface 7A and the disk 1.

Pad springs 11 and 11 are installed on the arm portions 2A of the mount member 2, respectively. These respective pad springs 11 are disposed between the mount member 2 and the inner-side and outer-side friction pads 6. The pad springs 11 elastically support the respective friction pads 6, and smooth sliding displacements of these respective friction pads 6. In addition thereto, one of the pad springs 11 regulates positions of side surfaces of intermediate portions of the return springs 21, which will be described below, in the disk rotational direction. Each of the pad springs 11 is formed by bending (stamping) a metallic plate material such as a stainless steel plate having a spring property.

Figure 12:
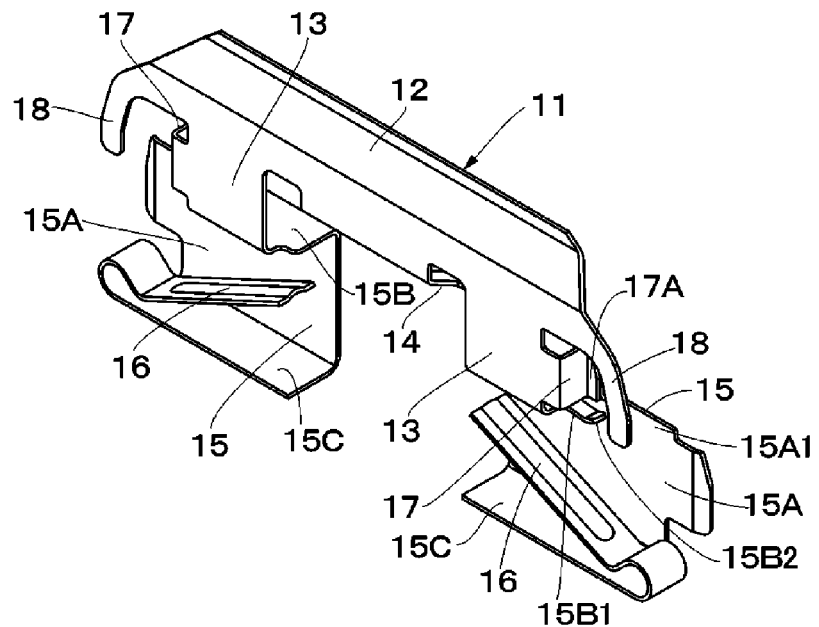
FIG. 12 is a perspective view of the pad spring on the right side in FIG. 7 (a trailing edge side) extracted from FIG. 7, as viewed from the same direction as FIG. 7.
Figure 13:
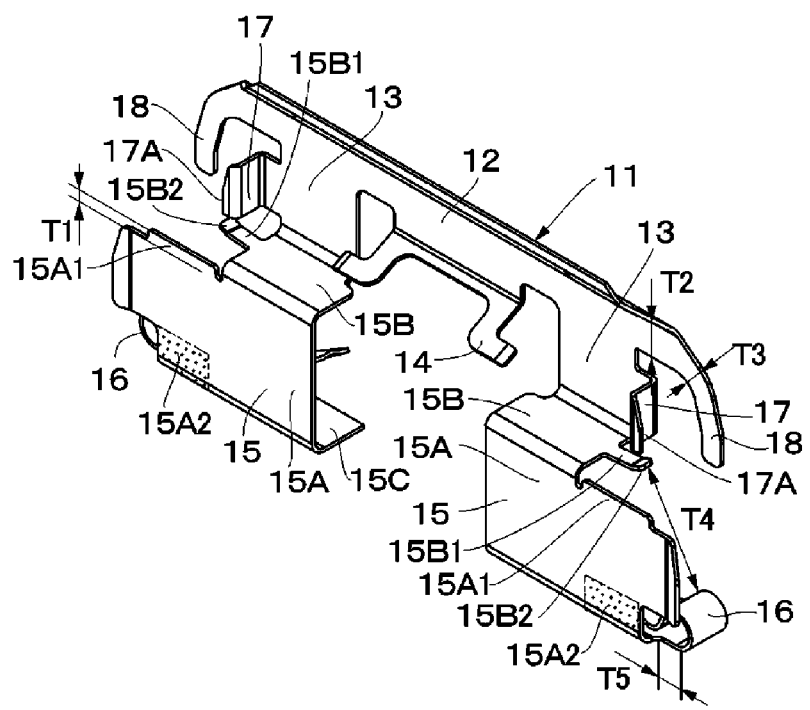
FIG. 13 is a perspective view of the pad spring on the left side in FIG. 7 (a leading edge side) extracted from FIG. 7, as viewed from the same direction as FIG. 7.

As illustrated in FIGS. 12 and 13 in detail, each of the pad springs 11 includes a connection plate portion 12, flat plate portions 13, an engagement plate portion 14, guide plate portions 15, radially biasing plate portions 16, abutment plate portions 17, and guide plate portions 18, which will be described below. These portions are integrally formed. The connection plate portion 12 is formed so as to extend in the disk axial direction while straddling over the outer circumferential side of the disk 1 to integrally connect the respective guide plate portions 15, which will be described below, on the inner side and the outer side of the disk 1. The pair of flat plate portions 13 and 13 is integrally formed on both end sides of the connection plate portion 12 in a longitudinal direction thereof so as to extend inwardly in the disk radial direction.

The engagement plate portion 14 is located between the pair of flat plate portions 13 and 13, and is formed integrally with the connection plate portion 12. The engagement plate portion 14 is attached to the mount member 2 so as to be engaged with the disk path portion of the arm portion 2A from the inner side in the disk radial direction. As a result, the pad spring 11 is positionally fixed relative to the arm portion 2A of the mount member 2 in the axial direction of the disk 1, and is prevented from being displaced in the rotational direction of the disk 1.

The pair of guide plate portions 15 and 15 is formed on the both end sides of the connection plate portion 12 via the respective flat plate portions 13. The respective guide plate portions 15 are formed by bending the flat plate portions 13 from inner end sides thereof in the disk radial direction so as to conform the shapes of the pad guides 3 (substantially U shapes or substantially squared U shapes). One of the pair of the guide plate portions 15 is attached by being fitted in the inner-side pad guide 3. The other of the pair of the guide plate portions 15 is attached by being fitted in the outer-side pad guide 3. The respective guide plate portions 15 function to guide the back plates 7 of the friction pads 6 in the disk axial direction via the protruding ear portions 7B and 7C.

The radially biasing plate portions 16 are integrally formed with inner sides of the respective guide plate portions 15 in the disk radial direction. The respective radially biasing plate portions 16 extend in the disk axial direction from the inner sides of the guide plate portions 15 in the disk radial direction, and are turned arcuately by approximately 360 degrees. Distal ends thereof extend to reach inner sides of the ear portions 7B and 7C in the disk radial direction so as to abut against the ear portions 7B and 7C of the respective friction pads 6 (the back plates 7). The respective radially biasing plate portions 16 are in elastic abutment with the ear portions 7B and 7C of the respective friction pads 6 (the back plates 7) in the respective pad guides 3 of the mount member 2, and bias the back plates 7 of the respective friction pads 6 outwardly in the disk radial direction. As a result, the respective radially biasing plate portions 16 can prevent the respective friction pads 6 from rattling, and smoothly guide the friction pads 6 along the guide plate portions 15 in the disk axial direction when a brake operation is performed.

The abutment plate portions 17 as abutment plates are provided on outer sides of the respective flat plate portions 13 in the disk axial direction, and are integrally formed so as to be bent from the respective flat plate portions 13 by approximately 90 degrees to extend in the disk rotational direction. The abutment plate portions 17 serve as receiving seat surfaces in abutment with distal end sides (abutment portions 25) of the return springs 21, which will be described below, in an elastically deformed state. In other words, the present embodiment is configured in such a manner that the return springs 21 are in abutment with the mount member side via the abutment plate portions 17 serving as metallic abutment plates. In this case, the abutment plate portions 17 are configured to extend from the pad spring 11. Further, distal end guide portions 17A are formed on distal end sides of the abutment plate portions 17 by obliquely or perpendicularly bending the abutment plate portions 17 in respective directions away from the disk 1. The distal end guide portions 17A limit or prevent movements of the distal end sides of the return springs 21, more specifically, the abutment portions 25 of the return springs 21 in a direction away from the friction pads 6 in the disk rotational direction.

The guide plate portions 18 as guide portions are provided on the both end sides of the connection plate portion 12 in the longitudinal direction (or on outer sides of the respective flat plate portions 13 in the disk axial direction and outer sides of the abutment plate portions 17 in the disk radial direction). Each of the guide plate portions 18 extends from the connection plate portion 12 (or each of the flat plate portions 13) in the direction away from the disk 1 in the disk axial direction, and is formed into a substantially one-fourth circular arc curved inwardly in the disk radial direction as it is getting farther away from the disk 1. The guide plate portions 18 support the side surfaces of the intermediate portions of the return springs 21, more specifically, side surfaces of second extension portions 24 of the return springs 21. Therefore, the guide plate portions 18 extend in the disk axial direction on same planes as the flat plate portions 13, and extend from the outer sides to the inner sides in the disk radial direction (while being curved) along portions where the flat plate portions 13 and the abutment plate portions 17 are connected to each other (portions where the flat plate portions 13 and the abutment plat portions 17 are bent by approximately 90 degrees from each other).

As a result, the guide plate portions 18 are configured to limit or prevent movements of the distal end sides of the return springs 21, i.e., portions extending from the second extension portions 24 to the abutment portions 25 toward the friction pads 6 in the disk rotational direction. In other words, the movements of the distal end sides of the return springs 21 away from the friction pads 6 in the disk rotational direction are limited or prevented by the distal end guide portions 17A of the abutment plate portions 17 of the pad springs 11, and the movements of the distal end sides of the return springs 21 toward the friction pads 6 are limited or prevented by the guide plate portions 18. As a result, the distal end sides of the return springs 21 can be placed into abutment with desired positions (the abutment plate portions 17).

The present embodiment has been described based on the example in which the guide plate portions 18 are formed into circular arcs. However, the present invention is not limited thereto. For example, each of the guide plate portions 18 may be configured to include an axially extending portion, which linearly extends from the connection plate portion 12 (or each of the flat plate portion 13) in the disk axial direction, and a radially extending portion, which inwardly extends from a distal end of the axially extending portion in the disk radial direction, i.e., may be formed into a substantially L shape as a whole. In other words, the guide plate portions 18 can be configured to extend toward support target portions of the side surfaces of the intermediate portions of the return springs 21.

Further, the present embodiment is configured in such a manner that the abutment plate portions 17 and the guide plate portions 18 are provided on both of the pad springs 11 on the leading edge side and the trailing edge side. However, the present embodiment may be configured in such a manner that the abutment plate portions 17 and the guide plate portions 18 are provided on only the pad spring 11 on the leading edge side where the return springs 21 are installed. In other words, the abutment plate portions 17 and the guide plate portions 18 can be omitted from the pad spring 11 on the trailing edge side where the return springs 21 are not installed. However, it is preferable that the disk brake is configured in such a manner that the pad spring 11 with the abutment plate portions 17 and the guide plate portions 18 formed thereon is installed on both the leading edge side and the trailing edge side, like the present embodiment, to allow common parts to be used as the pad springs 11 on the leading edge side and the trailing edge side and facilitate an assembling process.

Next, the return spring 21, which biases the friction pad 6 in a return direction for separating the friction pad 6 from the disk 1, will be described. The present embodiment is configured in such a manner that the side push spring 26 is provided at the return spring 21, and these return spring 21 and side push spring 26 are integrally formed with each other. The side push spring 26 according to the present embodiment serves to bias the friction pad 6 in the disk circumferential direction (the disk tangential direction), and also notify a driver or the like that it is time to replace the friction pad 6 (the lining 8 has been worn to reach a wear limit).

In other words, the return spring 21 constitutes the spring structure 20 together with the side push spring 26. Then, the spring structure 20 is formed as a metallic integrally formed spring member having three functions as a whole, by the return spring 21 having a function of returning the friction pad 6 to a return position where the friction pad 6 is separated from the disk 1 (a return function), and the side push spring 26 having two functions, a function of pushing the friction pad 6 in the disk tangential direction (the disk rotational direction) (a side push function) and a function of warning the driver about the wear limit of the lining 8 (a wear detection function). The present embodiment has been described based on the example in which the spring structure is provided as the metallic integrally formed spring member having all of the three functions to thereby reduce the cost and improve the installability. However, they may be provided separately. Further, the side push function and the wear detection function may be omitted.

The spring structure 20 is mounted on the side edge portion (the ear portion 7B) located on the disk leading edge side when the vehicle is running forward, which is one of the respective side edge portions (the ear portions 7B and 7C) of the back plate 7 included in each of the inner-side and outer-side friction pads 6. The spring structure 20 includes the return spring 21 and the side pushing spring 26, which are integrally formed by bending a spring material shaped from a metallic plate having a spring property such as a stainless steel plate with use of a metal stamping method or the like. The inner-side spring structure 20 and the outer-side spring structure 20 are identically configured except for such a difference that they are symmetrically (plane-symmetrically) formed about the disk 1. In the following description, the spring structure 20 will be described mainly focusing on the inner-side spring structure 20.

The returns spring 21 included in the spring structure 20 is disposed between the friction pad 6 and the mount member 2, more specifically, between the ear portion 7B on the disk leading edge side and the pad spring 11 disposed on the mount member 2. The return spring 21 biases the friction pad 6 in the return direction for separating the friction pad 6 from the disk 1, and is formed by bending the metallic spring material together with the side push spring 26.

The return spring 21 is configured in such a manner that a proximal end side thereof is fixed to the back plate 7 of the friction pad 6, and the distal end side thereof is in elastic abutment with the mount member 2 on the outer side in the disk radial direction relative to the proximal end side thereof.

Therefore, the return spring 21 includes a fixation portion 22, a first extension portion 23, the second extension portion 24, and the abutment portion 25.

The fixation portion 22 as a flat plate is fixedly swaged to the protrusion 9 of the ear portion 7B of the friction pad 6 (the back plate 7), thereby being positionally fixed while being also positioned in the rotational direction. Therefore, the noncircular swaging hole 22A is pierced through a substantially central position of the fixation portion 22. The protrusion 9 of the ear portion 7B is fittedly inserted in this hole 22A. The present embodiment is described based on the example in which the spring structure 20 is fixed by swaging. However, the present invention is not limited thereto. The spring structure 20 may be fixed by being clamped to each of the ear portions 7B and 7C of the back plate 7 of the friction pad 6. The fixation method can be arbitrarily designed.

The first extension portion 23 is formed by bending the fixation portion 22 in an L-shaped manner as if the first extension portion 23 is perpendicularly erected from the fixation portion 22, and a distal end side thereof extends in a direction perpendicularly separated from the surface of the disk 1. In other words, a proximal end side of the first extension portion 23 extends in the disk axial direction as the erected portion 23A, and a portion from an intermediate position to a distal end side of the first extension portion 23 extends obliquely relative to the disk axial direction, more specifically, obliquely toward the torque receiving surface 4 of the mount member 2, forming an inclined portion 23B.

The second extension portion 24 is bent at an acute angle or a right angle (approximately 45 to 90 degrees)) from the distal end side of the first extension portion 23 outwardly in the disk radial direction toward the abutment plate portion 17 of the pad spring 11, and extends outwardly in the disk radial direction toward the abutment plate portion 17 of the pad spring 11. The abutment portion 25 is substantially perpendicularly (70 to 90 degrees) bent from a distal end side of the second extension portion 24 toward the abutment plate portion 17 of the pad spring 11, and includes a folded portion 25A formed by folding a distal end side thereof in a U-shaped manner. This folded portion 25A is in elastic abutment with the abutment plate portion 17 of the pad spring 11. As a result, the return spring 21 is configured in such a manner that the distal end side (the abutment portion 25) thereof is in elastic abutment with the mount member side (the pad spring 11) on the outer side in the disk radial direction relative to the proximal end side (the fixation portion 22).

Figure 11:
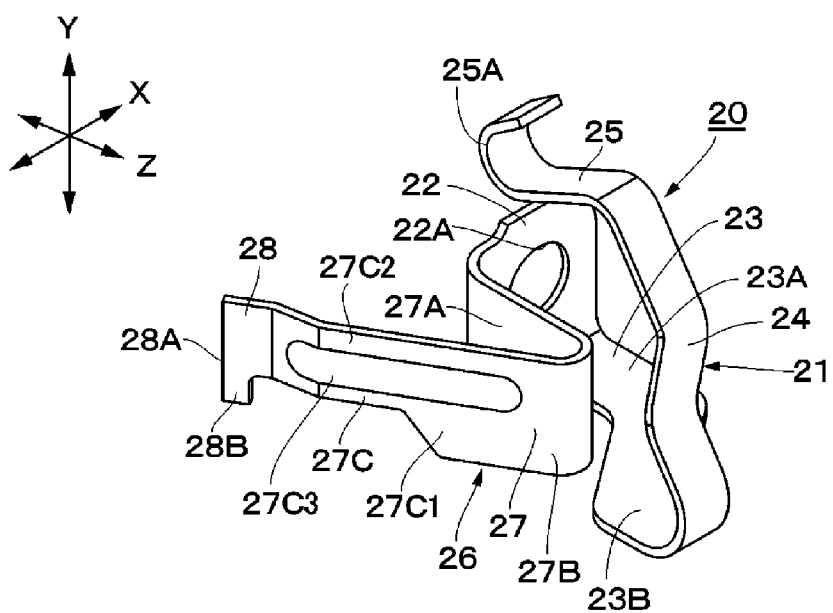
FIG. 11 is a perspective view of the spring structure extracted from FIG. 8, as viewed from the same direction as FIG. 8.

More specifically, the proximal end side of the first extension portion 23 of the return spring 21 is integrally formed with the fixation portion 22, and a direction of a plate thickness t (refer to FIG. 10) thereof is oriented in a Y axis direction illustrated in FIGS. 9 to 11 so as to substantially matches the radial direction of the disk 1. In other words, assuming that an X axis is an axis extending perpendicularly to the Y axis in the left-right direction, and a Z axis is a direction perpendicular to both the X axis and Y axis, the return spring 21 is formed in such a manner that the first extension portion 23 extends as if being erected from the fixation portion 22 in the Z axis direction with its plate width direction matching the X axis direction and the direction of the plate thickness t matching the Y axis direction.

Figure 2:
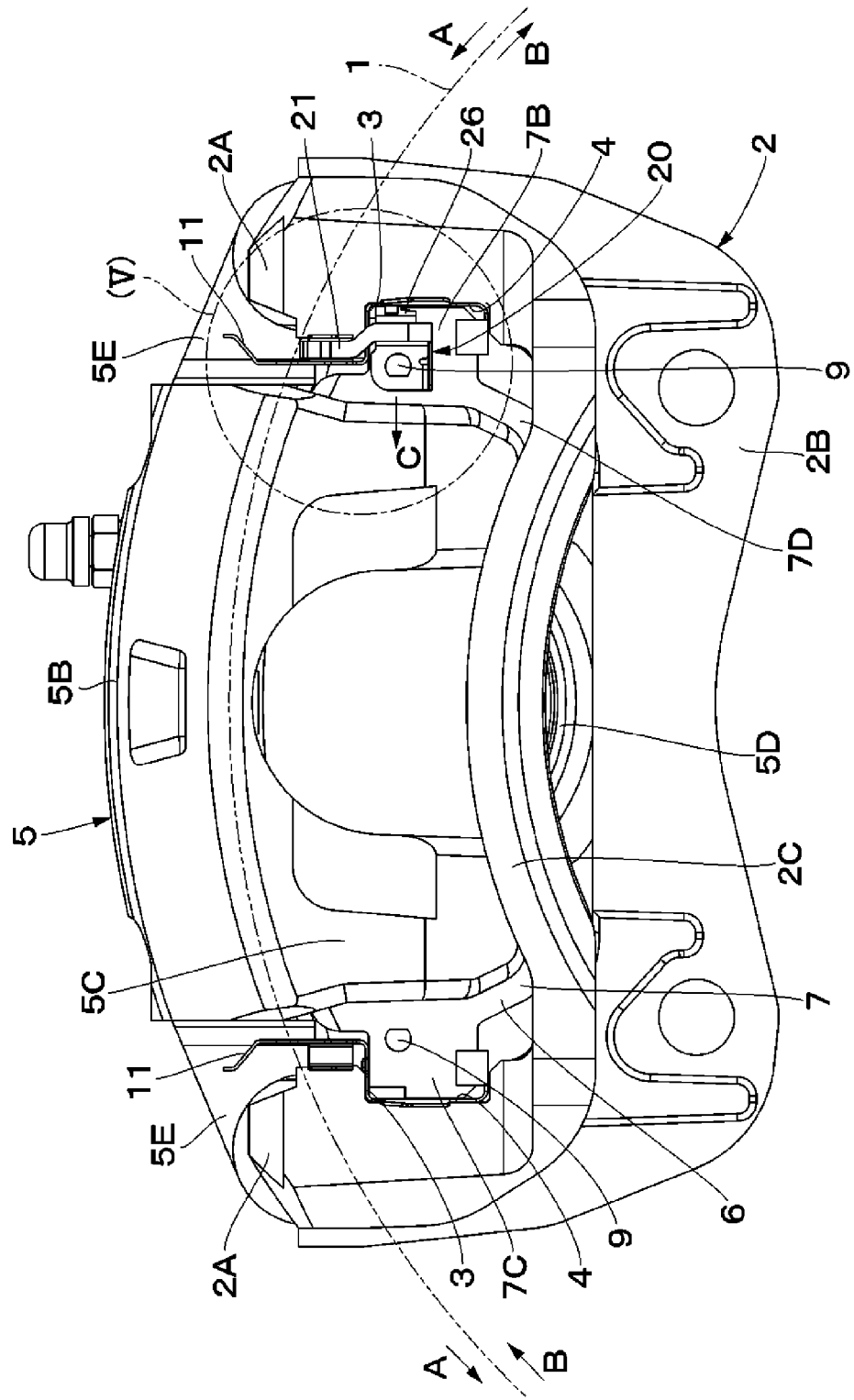
FIG. 2 is a front view of the disk brake as viewed from an outer side.
Figure 3:
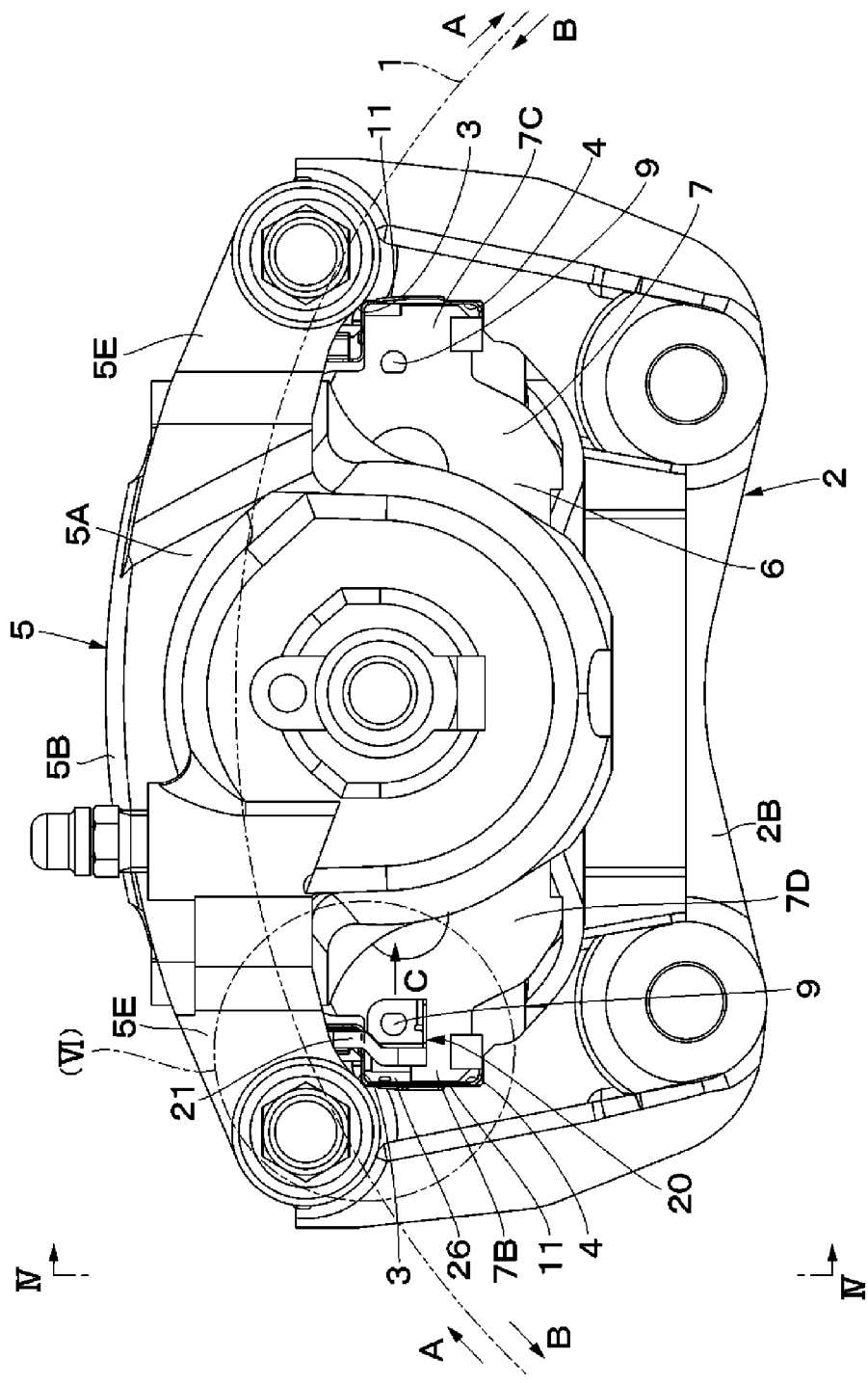
FIG. 3 is a back view of the disk brake as viewed from an inner side.
Figure 4:
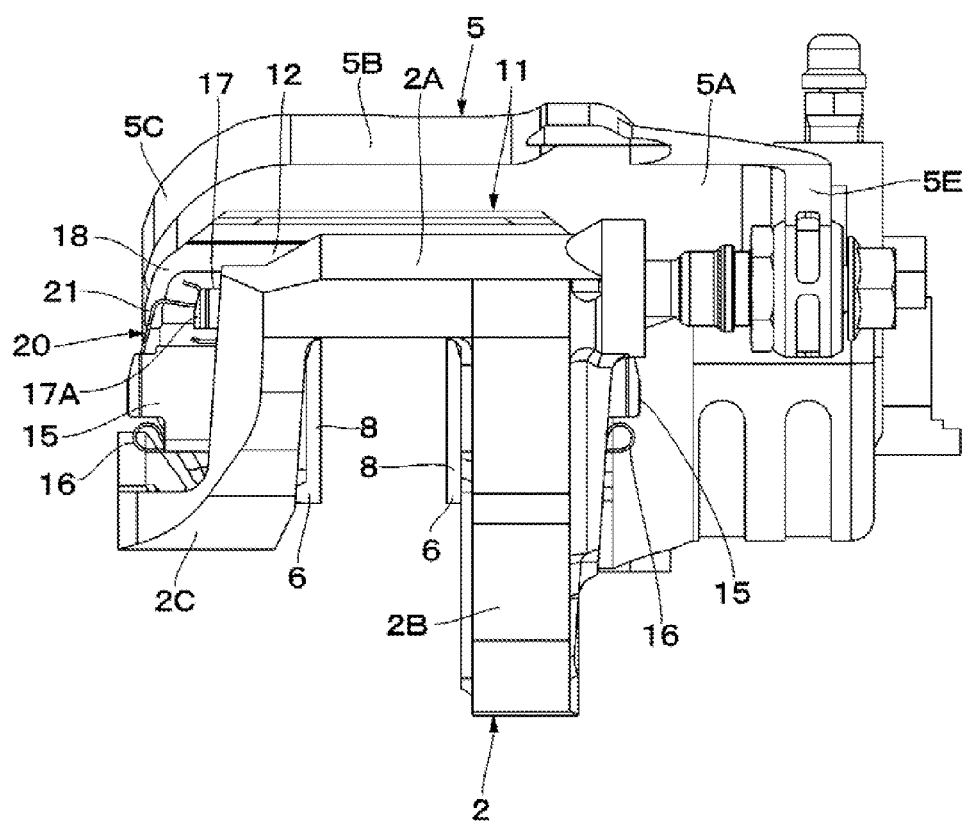
FIG. 4 is a side view of the disk brake as viewed from a direction indicated by arrows IV and IV illustrated in FIG. 3.
Figure 5:
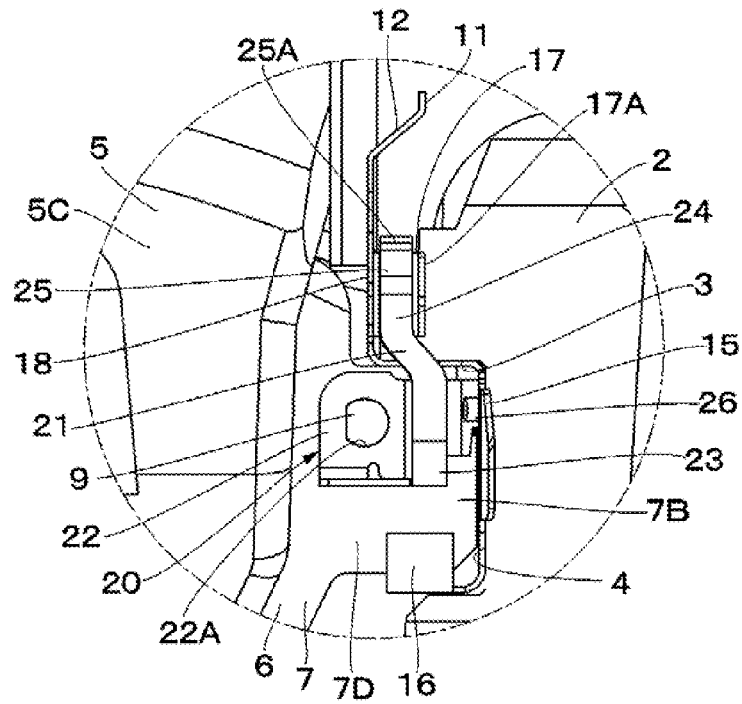
FIG. 5 is an enlarged view of a portion (V) illustrated in FIG. 2.
Figure 6:
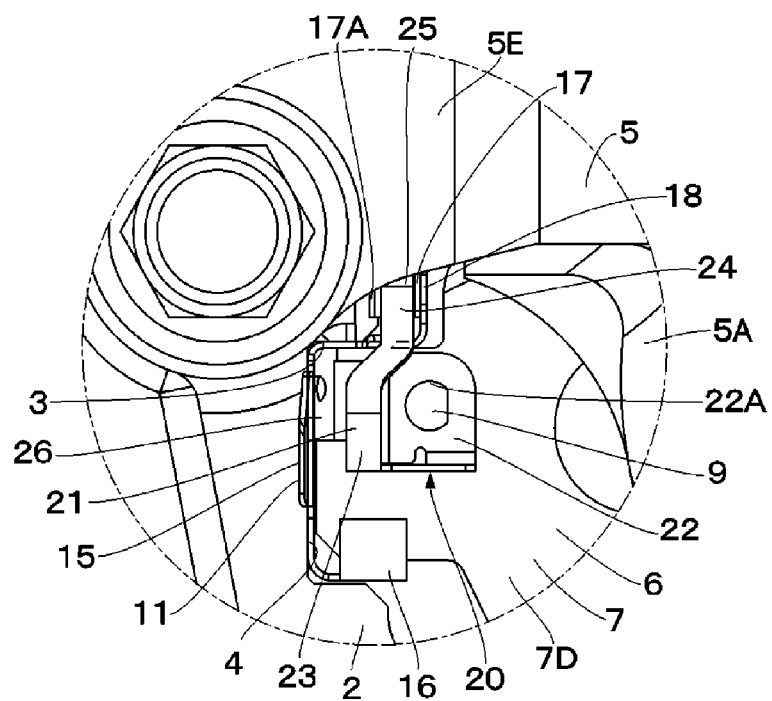
FIG. 6 is an enlarged view of a portion (VI) illustrated in FIG. 3.
Figure 7:
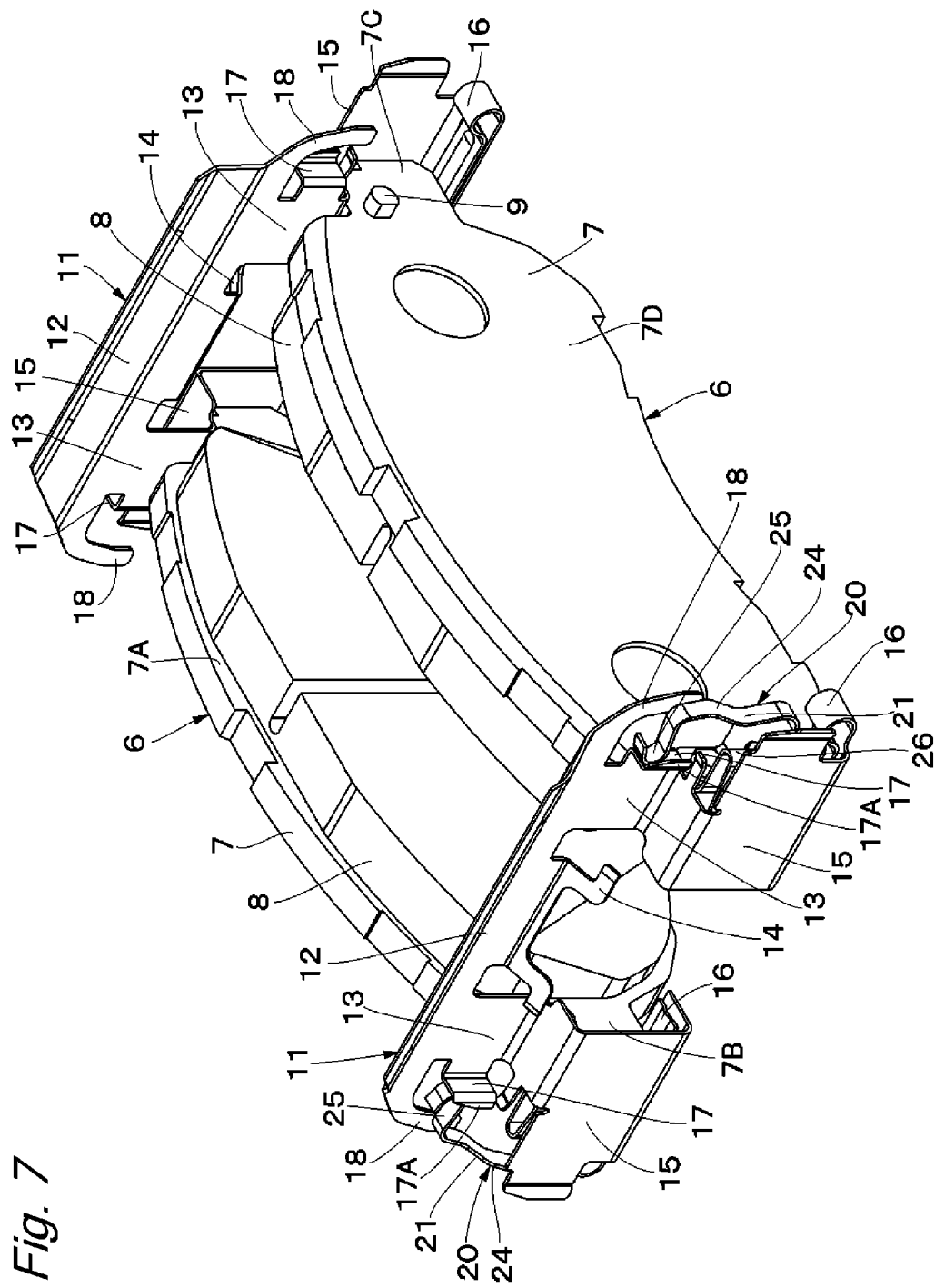
FIG. 7 is a perspective view of friction pads, pad springs, and spring structures extracted from the disk brake, as viewed from an upper left side in FIG. 3 (from above the inner side).

In this case, the X axis direction substantially corresponds to the circumferential direction (more precisely, the left-right direction or the tangential direction) of the disk 1 rotating in the direction indicated by the arrow A or the direction indicated by the arrow B in FIGS. 2 and 3. The Y axis direction substantially corresponds to the radial direction of the disk 1. The Z axis direction corresponds to the axial direction of the disk 1. Then, the fixation portion 22 of the return spring 21 is arranged in parallel with a plane defined by the X axis and the Y axis, and a plate thickness direction thereof is oriented in the Z axis direction.

The first extension portion 23 includes the inclined portion 23B at the distal end side from the intermediate position thereof, which extends obliquely relative to the erected portion 23A on the proximal end side. As a result, the proximal end side of the return spring 21 (the portion where the fixation portion 22 and the erected portion 23A are connected to each other) is offset (shift) from the distal end side (the abutment portion 25) in the tangential direction of the disk 1 (the X axis direction), thereby being prevented from interfering with the side push spring 26, which will be described below, and adjusting a spring force of the return spring 21.

Further, the second extension portion 24 is bent from the distal end of the first extension portion 23 in the Y axis direction at a right angle or an acute angle (in a direction slightly including a Z axis direction component), and is formed so as to extend toward the abutment plate portion 17 of the pad spring 11. As a result, the second extension portion 24 is formed so as to extend outside the side push spring 26 in the disk axial direction, thereby being prevented from interfering with the side push spring 26. Further, the abutment portion 25 is bent from the distal end of the second extension portion 24 in a substantially L-shaped manner in the Z axis direction. The folded portion 25A, which is formed by folding the distal end side of the abutment portion 25 in a U-shaped manner, is in elastic abutment with the abutment plate portion 17 of the pad spring 11 with line contact made therebetween.

Due to this configuration, the return spring 21 constantly biases the friction pad 6 (the back plate 7) in the return direction for separating the friction pad 6 from the disk 1, and therefore can stably return the friction pad 6 toward the return position (an initial position or a waiting position), for example, when a brake operation on the vehicle is released. In this case, the abutment portion 25 on the distal end side of the return spring 21 is in elastic abutment with the abutment plate portion 17 of the pad spring 11, which corresponds to the mount member side, outside the fixation portion 22 on the proximal end side of the return spring 21 in the disk radial direction. As a result, the friction pad 6 can tend to have such a posture at the return position that the radially outer side thereof is inclined farther away from the disk 1 than the radially inner side thereof, i.e., the friction pad 6 is opened outwardly (upwardly). The return spring 21 does not necessarily have to exert a biasing force strong enough to achieve the outwardly (upwardly) opened posture, as long as the friction pad 6 can be prevented from tending to have a posture opened inwardly (downwardly) at the above-described return position.

More specifically, as illustrated in FIG. 10, a load F is applied to the abutment portion 25 of the return spring 21 in the disk axial direction due to the abutment with the abutment plate portion 17 of the pad spring 11. In FIG. 10, a solid line indicates a free state in which the return spring 21 is out of abutment with the abutment plate portion 17 (before assembling) (a state in which the return spring 21 is not elastically deformed), and a long dashed double-short dashed line indicates a state in which the return spring 21 is elastically deformed in abutment with the abutment plate portion 17 (after assembling). A moment M is applied to the friction pad 6 about a main emphasis P where the ear portion 7B of the friction pad 6 and the fixation portion 22 are coupled to each other (a fixation portion) based on a component force F' of the load F. This moment M is a force for placing the friction pad 6 into such a posture that the radially outer side thereof is inclined farther away from the disk 1 than the radially inner side thereof. As a result, the radially outer side of the friction pad 6 tends to be separated from the disk 1, whereby a drag between this portion and the disk 1 can be reduced. In FIG. 10, Q indicates a radially central position of the ear portion 7B (a center of a slidably guided portion). Further, assuming that K represents a radial dimension of the lining 8, and L represents a distance dimension between the main emphasis P and the abutment portion 25, K is larger than L (K>L) so that the main emphasis P is contained in the dimension K.

The present embodiment has been described based on the example in which the return spring 21 is disposed only on the leading edge side. The reason therefor is as follows. Disk brakes have such a tendency that the leading edge side is drawn in, as a result of which the trailing edge side is more widely opened compared to the leading edge side. Therefore, according to the conventional technique, the radially inner side on the leading edge side tends to be most largely worn, leading to occurrence of uneven wear of the lining 8. Therefore, the present embodiment includes the return spring 21 only on the leading edge side, thereby solving the above-described problem of uneven wear. For example, if the disk brake has a twin-bore configuration including two cylinders and two pistons, and the leading edge side and the trailing edge side have similar wear tendencies by increasing the diameter of the piston on the trailing edge side than the piston on the leading edge side, the return spring 21 may be provided on both the leading edge side and the trailing edge side.

In either case, according to the present embodiment, the side surface of the second extension portion 24, which corresponds to the side surface of the intermediate portion of the return spring 21, is located close to the guide plate portion 18 of the pad spring 11 while facing it, with the spring structure 20 (the return spring 21) installed on the mount member 2 together with the friction pad 6. In other words, when the return spring 21 is installed on the mount member 2 together with the friction pad 6, the side surface of the second extension portion 24 is supported (guided) by the guide plate portion 18, which limits or prevents the movements of the second extension portion 24 and the abutment portion 25 toward the friction pad 6 in the disk rotational direction. As a result, after completion of the installation, the abutment position of the abutment portion 25 of the return spring 21 is regulated so as to be located at the abutment plate portion 17 of the pad spring 11. Further, for example, even when the distal end side of the return spring 21 is about to be offset from the abutment plate portion 17 due to application of an external force to the return spring 21 from a hit or the like of a flying stone or the like when the vehicle is running on an unpaved road or the like, this offset can be also prevented because the side surface of the intermediate portion (the side surface of the second extension portion 24) of the return spring 21 is supported by the guide plate portion 18 of the pad spring 11.

Next, the side push spring 26, which is formed integrally with the return spring 21, will be described.

The side push spring 26 constitutes the spring structure 20 together with the return spring 21. The side push spring 26 is disposed between the ear portion 7B located on the disk leading edge side when the vehicle is running forward, and the torque receiving surface 4 of the mount member 2, which faces this ear portion 7B. The side push spring 26 has the push function as a circumferentially biasing portion, which biases the pad guide 3 to push the friction pad 6 toward the trailing edge side of the disk 1 in the disk circumferential direction. Further, in addition thereto, the side push spring 26 also has the function of warning the driver or the like about the fact that the lining 8 has reached the wear limit by generating a noise when the distal end of the side push spring 26 disposed between the back plate 7 of the friction pad 6 and the disk 1, i.e., the vibration portion 28 (the distal end 28A thereof) is in contact with the disk 1.

The side push spring 26 generally includes the fixation portion 22, which is shared with the return spring 21, a push portion 27, and the vibration portion 28. These fixation portion 22, push portion 27, and vibration portion 28 are integrally formed. The push portion 27 is formed by bending the plate from the fixation portion 22 so as to define a U shape in cross-section on the back surface side of the back plate 7. The push portion 27 includes a bent piece portion 27A, a folded portion 27B, and an abutment portion 27C.

The bent piece portion 27A is formed by bending the plate in an L-shaped manner so as to be erected perpendicularly from the fixation portion 22 at a position separated from the first extension portion 23 of the return spring 21 in the X and Y axis directions. A distal end side of the bent piece portion 27A extends in the Z axis direction perpendicularly away from the surface of the disk 1. In other words, the bent piece portion 27A is disposed into a positional relationship substantially perpendicular to the first extension portion 23, and extends substantially in parallel with a plane defined by the Y axis and the Z axis.

The folded portion 27B is formed by folding the distal end side of the bent piece portion 27A in a substantially U-shaped manner, and extends reversely in the Z axis direction. The abutment portion 27C is connected to a distal end side of the folded portion 27B, and extends from this distal end side toward the disk facing surface 7A of the back plate 7 toward the disk 1.

The abutment portion 27C includes a tapered portion 27C1 having a width dimension reducing toward the disk 1, and a constant width portion 27C2 extending toward the disk 1 without a change in the width dimension (constant). Further, the abutment portion 27C includes a protrusion portion 27C3 extending across from the tapered portion 27C1 to the constant width portion 27C2.

The abutment portion 27C (the protrusion portion 27C3) is in abutment (elastic contact) with the torque receiving surface 4 of the mount member 2 via the guide plate portion 15 of the pad spring 11 while being elastically deformed. The abutment portion 27C is in elastic contact with the torque receiving surface 4 via the pad spring 11, by which the push portion 27 of the side push spring 26 biases the friction pad 6 in the disk tangential direction, more specifically, toward the trailing edge side of the disk 1.

The vibration portion 28 included in the side push spring 26 extends from a distal end side of the push portion 27 (the abutment portion 27C) toward the disk 1. The vibration portion 28 generates a noise (an abnormal noise) due to a vibration of the distal end 28A thereof from contact with the side surface (the surface) of the disk 1 in the disk axial direction when the lining 8 of the friction pad 6 has been worn to reach a predetermined portion (the wear limit) set in advance.

More specifically, as illustrated in FIG. 10, when the disk facing surface 7A of the back plate 7 while the vehicle is braked is displaced closer to the disk 1 due to wear of the lining 8, the distal end 28A of the vibration portion 28 contacts the side surface of the disk 1 to vibrate, thereby generating a noise. As a result, a warning can be issued to the driver or the like to indicate that it is time to replace the friction pad 6 (the lining 8 has been worn to reach the wear limit). In FIG. 10, a solid line indicates the side push spring 26 in a free state before the friction pad 6 and the spring structure 20 are installed on the mount member 2 (without the spring structure 20 elastically deformed), and a long dashed double-short dashed line indicates the side push spring 26 with the spring structure 20 elastically deformed after the installation.

As illustrated in FIG. 10, the vibration portion 28 is formed in such a manner that a dimension W1 of the distal end 28A of the vibration portion 28 in the disk radial direction is larger than a dimension W2 of the constant width portion 27C2 in the disk radial direction, which is the portion of the side push spring 26 that biases the pad guide 3, i.e., the portion of the abutment portion 27C of the push portion 27 that overlaps the ear portion 7B in the disk circumferential direction. Therefore, a protrusion portion 28B, which protrudes inwardly in the disk radial direction, is formed on the distal end 28A of the vibration portion 28. As a result, the vibration portion 28 is configured in such a manner that a part (the protrusion portion 28B) of the vibration portion 28 can enter between the disk facing surface 7A of the back plate 7 and the disk 1.

When the lining 8 has been worn to reach the wear limit, the distal end 28A of the vibration portion 28 contacts the side surface of the disk 1. At this time, the vibration portion 28 is oriented in such a manner that a plate thickness direction thereof matches the X axis direction (approximately the circumferential direction of the disk 1). Therefore, for example, when the vibration portion 28 contacts the disk 1 rotating in the direction indicated by the arrow A or the direction indicated by the arrow B in FIG. 3, the vibration portion 28 is elastically deformed naturally in the same direction.

Further, the distal end 28A of the vibration portion 28 has the large dimension W1 in the disk radial direction, whereby the distal end 28A can contact the disk 1 with a wide area, thereby succeeding in reliably generating the warning noise, increasing the volume of the noise, and the like. Further, when the distal end 28A of the vibration portion 28 contacts the side surface of the disk 1, a part (the protrusion portion 28B) of the distal end 28A is sandwiched between the disk facing surface 7A of the back plate 7 and the side surface of the disk 1. As a result, the distal end 28A of the vibration portion 28 is pressed against the side surface of the disk 1, which also contributes to the reliable generation of the warning noise, the increase in the volume of the noise, and the like.

The disk brake according to the present embodiment is configured in the above-described manner, and an operation thereof will be described next.

First, when a brake operation is performed on the vehicle, a brake hydraulic pressure is supplied into the inner leg portion 5A (the cylinder) of the caliper 5, thereby slidably displacing a piston 5D toward the disk 1. As a result, the inner-side friction pad 6 is pressed against one side surface of the disk 1. Then, at this time, since the caliper 5 receives a pressing reaction force from the disk 1, the entire caliper 5 is slidably displaced toward the inner side relative to the arm portions 2A of the mount member 2, whereby the outer leg portion 5C presses the outer-side friction pad 6 against the other side surface of the disk 1.

As a result, the inner-side and outer-side friction pads 6 can strongly sandwich the disk 1 rotating in, for example, the direction indicated by the arrow A in FIGS. 2 and 3 (when the vehicle is running forward) therebetween from both of the axial sides, thereby succeeding in providing a braking force to the brake 1. Then, when the brake operation is released, a stop of the hydraulic supply into the piston 5D causes the inner-side and outer-side friction pads 6 to be separated from the disk 1, thereby returning the vehicle to a non-braked state again. At this time, the inner-side and outer-side friction pads 6 are stably returned to the return positions (the initial positions or the waiting positions) separated from the disk 1 by the return springs 21.

When the brake operation is performed or released (when the vehicle is not braked) in this manner, the ear portions 7B, which are the ones of the ear portions 7B and 7C of the friction pads 6 that are located on the leading edge side of the disk 1, are biased by the push portions 27 of the side push springs 26 in a direction indicated by an arrow C in FIGS. 2 and 3, and the friction pads 6 are constantly biased by weak forces toward the trailing edge side of the disk 1 (in the direction indicated by the arrow A in FIGS. 2 and 3). Then, the ear portions 7C located on the trailing edge side of the disk 1 are elastically pressed by the biasing forces at this time against the torque receiving surfaces 4 of the pad guides 3 via the guide plate portions 15 of the pad spring 11.

Therefore, the friction pads 6 can be prevented from rattling in the disk circumferential direction due to a vibration or the like when the vehicle is running, by the side push springs 26 disposed between the ear portions 7B and the torque receiving surfaces 4 on the leading edge side of the disk 1. Then, when the vehicle is braked while being running forward, the braking torques that the friction pads 6 receive from the disk 1 (rotational torques in the direction indicated by the arrow A) can be borne by the arm portion 2A (the torque receiving surfaces 4 of the pad guides 3) on the trailing edge side.

As a result, the ear portions 7C of the friction pads 6 located on the trailing edge side of the disk 1 continue abutting against the torque receiving surfaces 4 of the pad guides 3 via the guide plate portions 15. Further, before the brake operation is performed, the ear portions 7C on the trailing edge side are in abutment with the guide plate portions 15 due to the biasing forces of the push portions 27 of the side push springs 26, without any clearance (space) generated therebetween. Therefore, the friction pads 6 can be prevented from being displaced to generate an abnormal noise (a rattling noise) due to the braking torques.

According to the conventional technique, the return spring is configured in such a manner that the distal end side of the return spring is in elastic abutment with the mount member side on the inner side in the disk radial direction relative to the proximal end side of the return spring fixed to the back plate of the friction pad. According to this configuration, the posture of the friction pad may tend to be opened inwardly (downwardly) at the return position in response to the biasing force of the return spring, i.e., the outer side of the friction pad in the disk radial direction may tend to be inclined toward the disk, thereby resulting in easy occurrence of a drag between this portion and the disk.

In other words, according to the conventional technique, the return spring is configured in such a manner that the distal end side of the return spring returns the friction pad to the return position by pushing a position offset inwardly in the disk radial direction from a centroid of the friction pad and the center of the slidably guided portion for axially guiding the friction pad in the disk radial direction. Therefore, the friction pad tends to have such a posture at the return position that the outer side in the disk radial direction is inclined toward the disk. As a result, when a drag occurs, an effective radius of this drag increases, leading to such a possibility of failing to sufficiently acquire a drag reduction effect by the return spring when the disk tends to be inclined toward the outer side due to, for example, a thermal inclination.

Further, according to the conventional technique, the return spring is configured to extend in the disk tangential direction, leading to a possibility of an increase in the size of the return spring including the receiving portion of the mount member side for receiving the return spring. Further, when the friction pad with the return spring attached thereto is installed on the mount member, this installation process may become cumbersome. More specifically, when the ear portion of the friction pad with the return spring attached thereto is to be inserted in the pad guide of the mount member, the distal end side of the return spring is easily stuck to the receiving surface side of the mount member before the ear portion of the friction pad is inserted into the pad guide according to the extension of the distal end side of the return spring in the disk tangential direction. As a result, the installation process may become cumbersome.

On the other hand, according to the present embodiment, the return spring is configured in such a manner that the abutment portion 25 at the distal end side of the return spring 21 is in elastic abutment with the mount member side (the abutment plate portion 17 of the pad spring 11) on the outer side in the disk radial direction relative to the fixation portion 22 on the proximal end side fixed to the back plate 7 of the friction pad 6. Therefore, the moment M is applied to the ear portion 7B of the back plate 7 of the friction pad 6 with the fixation portion 22 of the return spring 21 fixed thereto in the direction for separating the outer side of the friction pad 6 in the disk radial direction from the disk 1, based on the abutment between the abutment portion 25 and the mount member side, which is made on the outer side in the disk radial direction relative to the fixation portion 22.

More specifically, as illustrated in FIG. 10, the load F is applied to the abutment portion 25 of the return spring 21 in the disk axial direction due to the abutment with the abutment plate portion 17 of the pad spring 11. As a result, the moment M is applied to the friction pad 6 about the main emphasis P where the ear portion 7B of the friction pad 6 and the fixation portion 22 are connected to each other (the fixation portion), based on the component force F' of the load F. This moment M serves as a force for placing the friction pad 6 into such a posture that the outer side thereof in the radial direction is inclined farther away from the disk 1 than the inner side thereof in the radial direction.

As a result, the friction pad 6 tends to have such a posture at the return position that the outer side thereof in the disk radial direction is inclined farther away from the disk 1 than the inner side thereof in the disk radial direction, whereby it is possible to reduce a drag between the outer side of the friction pad 6 in the disk radial direction and the disk 1. Further, according thereto, it is also possible to prevent the lining 8 of the friction pad 6 from being unevenly worn, thereby assuring the stability and reliability of the braking performance.

Further, the guide plate portions 18 are formed at the pad spring 11. Each of the guide plate portions 18 extends in the disk axial direction, and supports the side surface of the intermediate portion of the return spring 21, i.e., the side surface of the second extension portion 24. Therefore, the abutment position of the abutment portion 25 of the return spring 21 can be regulated so as to be located at the abutment plate portion 17 by the guide plate portion 18. Therefore, when the disk brake is assembled, the guide plate portion 18 can prevent the abutment portion 25 of the return spring 21 from being offset from the abutment plate portion 17 (prevent the return spring 21 from being incompletely installed). Further, even when the abutment portion 25 of the return spring 21 tends to be offset from the abutment plate portion 17 due to application of an external force to the return spring 21 or the like, the second extension portion 24 of the return spring 21 is supported by the guide plate portion 18, thereby succeeding in preventing this offset. For example, even when a flying stone or the like hits the return spring 21 when the vehicle is running on an unpaved road or the like, the second extension portion 24 of the return spring 21 abuts against the guide plate portion 18, thereby succeeding in preventing the return spring 21 from being deformed more than that (a positional displacement of the abutment portion 25).

Further, the abutment portion 25 of the return spring 21 can be regulated so as to abut against a desired abutment position, whereby it is possible to reduce the sizes of the abutment portion 25 and the abutment plate portion 17 of the pad spring 11 (miniaturize them). As a result, it is possible to improve the flexibility of the layout of the return spring 21, and the flexibility of the design of the pad spring 11. For example, even when only a narrow available gap (space) is generated between the mount member 2 and the caliper 5 due to a size reduction of the disk brake, the return spring 21 can be installed in this narrow gap.

According to the first embodiment, the guide plate portion 18 is formed into a flat plate shape. However, like a pad spring 31 illustrated in FIGS. 14 to 16 as a modification, a bent portion 32A may be formed at a position of a guide plate portion 32 away from the disk 1 in the disk axial direction.

This bent portion 32A extends by being bent from the position of the guide plate portion 32 away from the disk 1 in the disk axial direction toward an opposite side from the direction in which the guide plate portion 15 protrudes. In this manner, the bent portion 32A is formed on the guide plate portion 32, by which the bent portion 32A guides the return spring 21 when the friction pad 6 is installed, whereby it is possible to further improve installability than the configuration of the guide plate portion 18 according to the first embodiment.

According to the first embodiment and the modification, the return spring 21 is configured in such a manner that the distal end side of the return spring 21 returns the friction pad 6 to the return position by pressing the outer side in the disk radial direction relative to the pad guide 3. Therefore, the abutment plate portion 17 of the pad spring 11, which serves as the seat portion for receiving the distal end side of the return spring 21, can be formed on the outer side in the disk radial direction relative to the guide plate portion 15 of the pad spring 11. As a result, compared to the conventional technique, it is possible to prevent the pad spring 11 from being deformed, especially, the guide plate portion 15 from being deformed due to the reaction force of the return sprint 21, and therefore it is possible to prevent the sliding performance of the friction pad 6 from being deteriorated and a low-pressure brake noise from increasing, which otherwise might occur due to a deformation of the pad spring 11.

Further, compared to the conventional technique, it is possible to reduce the size (length) of the abutment plate portion 17, which serves as the seat portion for receiving the distal end side of the return spring 21. As a result, it is possible to reduce the size of the pad spring 11 (miniaturize the pad spring 11), thereby improving the yield ratio of the pad spring 11.

According to the first embodiment and the modification, the return spring 21 is configured in such a manner that the distal end side thereof extends outwardly in the disk radial direction relative to the proximal end side. Therefore, when the friction pad 6 with the return spring 21 attached thereto is installed on the mount member 2, i.e. when the ear portions 7B and 7C of the friction pad 6 with the return spring 21 attached thereto are inserted into the pad guides 3 of the mount member 2 while the outer side of the friction pad 6 in the disk radial is inclined farther away from the disk 1 than the inner side of the friction pad 6 in the disk radial direction, it is possible to increase a distance (an interference) between the distal end (the abutment portion 25) of the return spring 21 and the mount member side (the abutment plate portion 17 of the pad spring 11). Therefore, it is possible to place the distal end (the abutment portion 25) of the return spring 21 into abutment with the mount member side (the abutment plate portion 17 of the pad spring 11) after the ear portions 7B and 7C of the friction pad 6 are inserted into the pad guides 3 of the mount member 2. As a result, it is possible to facilitate the process of installing the friction pad 6 with the return spring 21 attached thereto, improve the installability, and enhance the manufacturing efficiency of the disk brake. At this time, the second extension portion 24 of the return spring 21 is supported by the guide plate portion 18, by which the abutment position of the abutment portion 25 of the return spring 21 can be regulated so as to be located at the abutment plate portion 17 of the pad spring 11.

According to the first embodiment and the modification, the return spring 21 is configured in such a manner that the distal end side extends outwardly in the disk radial direction relative to the proximal end side. Therefore, it is possible to reduce the dimension in the disk tangential direction (make it compact) compared to the configuration in which the distal end side of the return spring extends from the proximal end side in the disk tangential direction. As a result, it is possible to prevent the torque receiving portion (the guide plate portion 15) of the pad spring 11 from being deformed due to the distal end side of the return spring 21 stuck with the mount member 2 and the pad spring 11 when the friction pad 6 with the return spring 21 attached thereto is installed onto the mount member 2.

Figure 14:
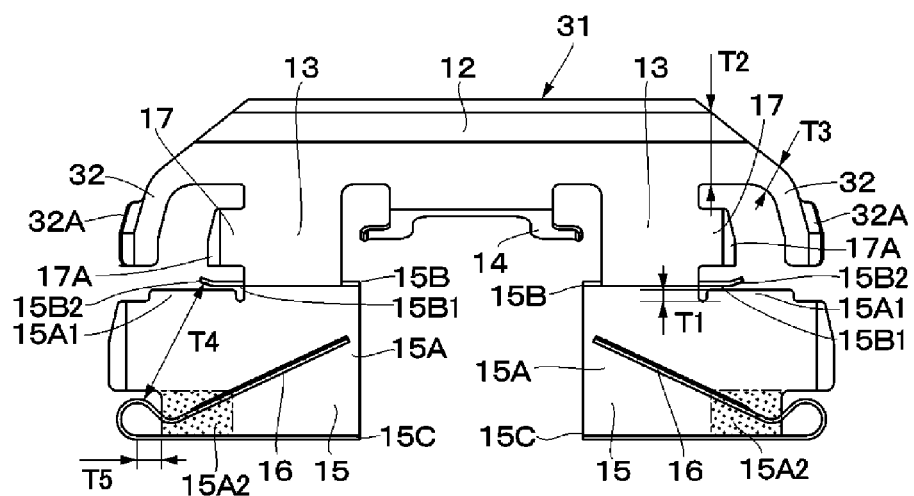
FIG. 14 is a front view of a pad spring according to a modification as viewed from a disk rotational direction.
Figure 15:
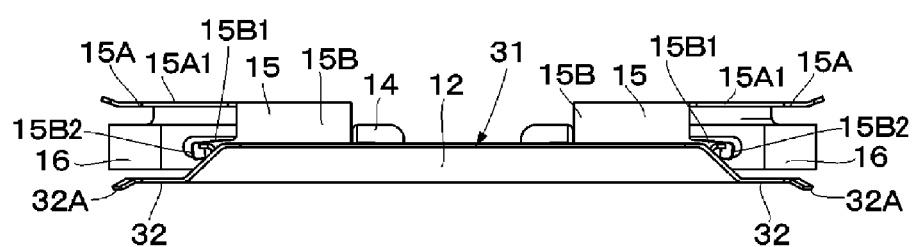
FIG. 15 is a plane view of the pad spring according to the modification as viewed from the outer side in the disk radial direction.

According to the first embodiment and the modification, as illustrated in FIGS. 12 to 16, a protrusion portion 15A1 is formed on the abutment plate 15A of the guide plate portion 15 of the pad spring 11 at a position outside in the disk axial direction (a position away from the disk). The abutment plate 15A corresponds to the portion sandwiched between a facing surface 7E of the ear portion 7B or 7C of the friction pad 6 and the torque receiving surface 4 of the mount member 2. In this case, the protrusion portion 15A1 protrudes outwardly in the disk radial direction by a dimension T1, as illustrated in FIGS. 13 and 14.

When the friction pad 6 with the spring structure 20 attached thereto as illustrated in FIG. 8 is installed on the mount member 2 with the pad spring 11 attached thereto, the distal end side of the side push spring 26, i.e., the vibration portion 28 or the abutment portion 27C of the push portion 27 is placed into abutment with the abutment plate 15A of the guide plate portion 15. At this time, the distal end side of the side push spring 26 is in abutment with the abutment plate 15A including the protrusion portion 15A1. Therefore, the distal end side of the side push spring 26 can be in abutment with the abutment plate 15A with a wider area when the friction pad 6 is installed, according to the provision of the protrusion portion 15A1, whereby it is possible to improve the installability of the friction pad 6.

According to the first embodiment and the modification, each of the guide plate portions 18 and 32 of the pad spring 11 has an increased (large) width dimension across from the proximal end side thereof to the curved portion (the bent portion). More specifically, as illustrated in FIGS. 13 and 14, a width dimension T2 of the proximal end side of each of the guide plate portions 18 and 32 is larger than a width dimension T3 of the curved portion of each of the guide plate portions 18 and 32. This dimensional arrangement can improve the strength of each of the guide plate portions 18 and 32.

Further, an outer portion of the connection plate portion 12 in the disk radial direction is bent in the disk circumferential direction over almost the entire longitudinal direction, which corresponds to the disk axial direction. In this case, the bent edge of the connection plate portion 12 is positioned on the proximal end side of each of the guide plate portions 18 and 32. In other words, the outer portion of the connection plate portion 12 in the disk radial direction is bent from the proximal end side of each of the guide plate portions 18 and 32 in the disk circumferential direction. As a result, it is possible to enhance the rigidity of the proximal end side of each of the guide plate portions 18 and 32, and this also contributes to the improvement of the strength of each of the guide plate portions 18 and 32.

According to the first embodiment and the modification, a guide protrusion portion 15B1, which protrudes outwardly in the disk axial direction, is formed on an outer plate 15B of the guide plate portion 15 of the pad spring 11. An outer surface of the ear portion 7B or 7C of the friction pad 6 in the disk radial direction is in abutment with the outer plate 15B. When the friction pad 6 is installed on the mount member 2 with the pad spring 11 attached thereto, the outer surface of the ear portion 7B or 7C of the friction pad 6 in the disk radial direction is in abutment with the guide protrusion portion 15B1, by which the guide protrusion portion 15B1 guides the ear portion 7B or 7C in the disk axial direction.

In this case, a distal end side of the guide protrusion portion 15B1 is bent outwardly in the disk radial direction. More specifically, a bent portion 15B2 bent outwardly in the disk radial direction is formed on the distal end side of the guide protrusion portion 15B1 forms. This can increase (widen) a dimension T4 (refer to FIGS. 13 and 14) of an opening in which the ear portion 7B or 7C is inserted when the friction pad 6 is installed. As a result, it is possible to ensure the movable flexibility of the friction pad 6 in the disk radial direction when the ear portion 7B or 7C of the friction pad 6 is inserted in the guide plate portion 15, and this can also contribute to the improvement of the installability of the friction pad 6.

Figure 16:
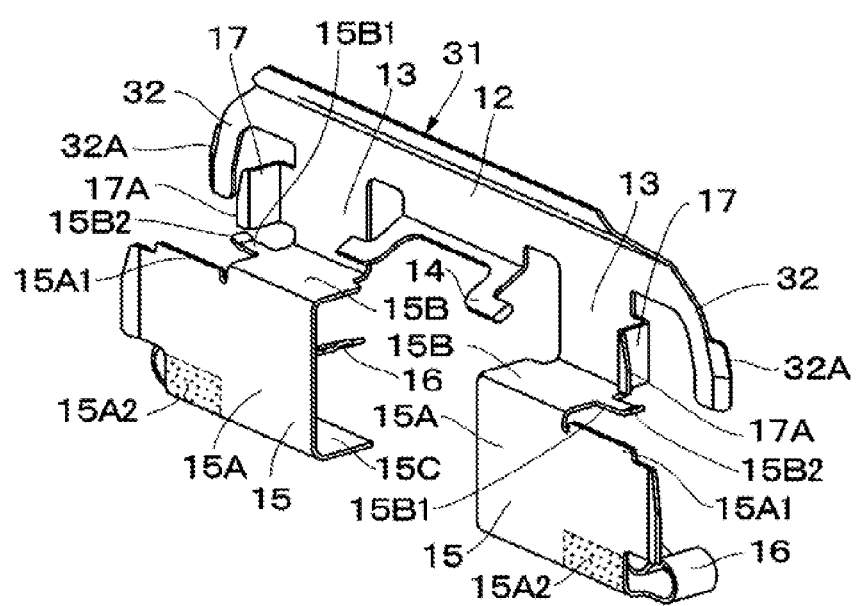
FIG. 16 is a perspective view of the pad spring according to the modification as viewed from the same direction as FIG. 13.

According to the first embodiment and the modification, a dimension addition portion 15A2 is formed on the abutment plate 15A of the guide plate portion 15 as indicated by a flecked pattern in FIGS. 13, 14, and 16. Providing this dimension addition portion 15A2 can reduce a dimension T5 (refer to FIGS. 13 and 14) of the proximal end side of the radially biasing plate portion 16 compared to a lack of the dimension addition portion 15A2 (the abutment plate 15A with the position corresponding to the dimension addition portion 15A2 cut out therefrom). In other words, it is possible to reduce the dimension T5 of the portion of the radially biasing plate portion 16 that extends in the disk axial direction from an inner portion of the guide plate portion 15 in the disk radial direction (an inner plate 15C). This can reduce a deflection amount of the proximal end side of the radially biasing plate portion 16, thereby increasing an upthrust constant of the radially biasing plate portion 16.

Figure 17:
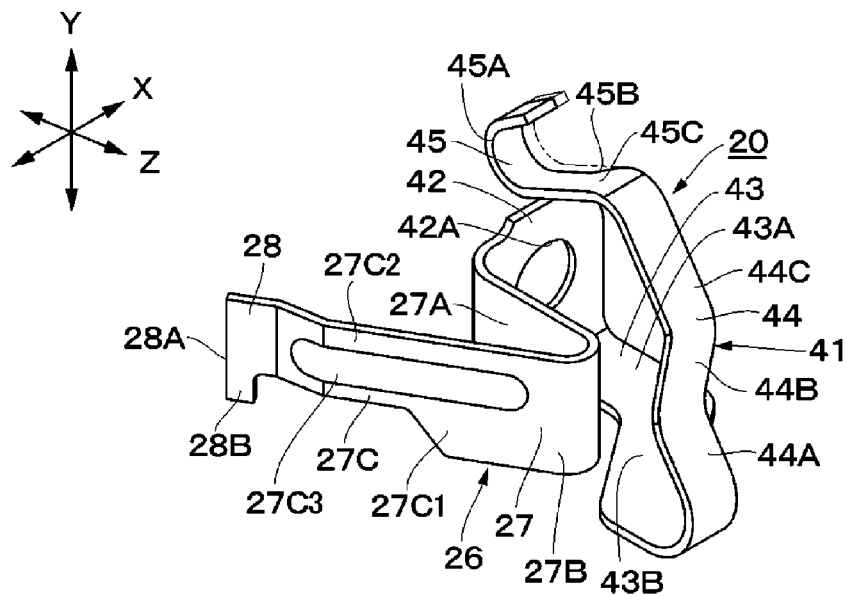
FIG. 17 is a perspective view of a spring structure according to a second embodiment as viewed from the same direction as FIG. 11.
Figure 18:
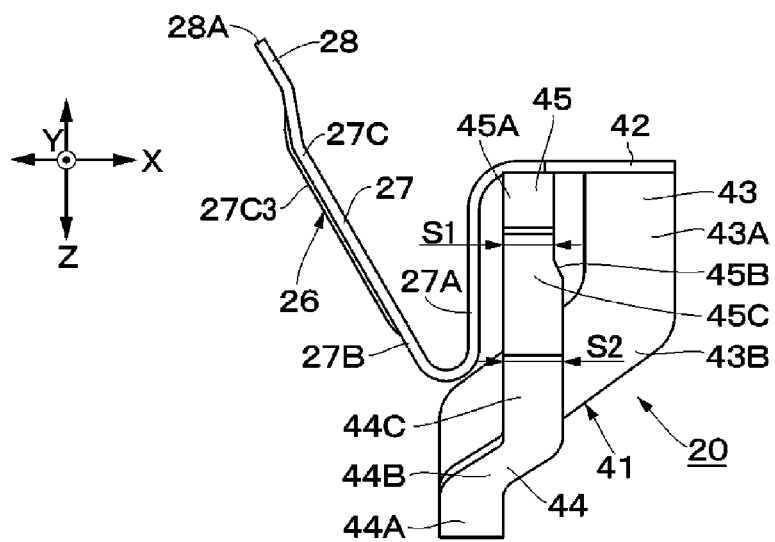
FIG. 18 is a plane view of the spring structure illustrated in FIG. 17 as viewed from above.

Next, FIGS. 17 and 18 illustrate a second embodiment. The second embodiment is characterized by a return spring formed in such a manner that a width of a second portion is narrower than a width of a first portion. The second embodiment will be described, identifying similar elements to the above-described first embodiment with same reference numerals, and omitting descriptions thereof.

A return spring 41 according to the second embodiment also includes a fixation portion 42, a first extension portion 43, a second extension portion 44, and an abutment portion 45 in a similar manner to the return spring 21 according to the first embodiment. The fixation portion 42 is fixed to the ear portion 7B of the friction pad 6 (the back plate 7) and includes a swaging hole 42A pierced therethrough, in a similar manner to the fixation portion 22 of the return spring 21 according to the first embodiment.

The first extension portion 43 is formed by bending the fixation portion 42 in an L-shaped manner as if the first extension portion 43 is perpendicularly erected from the fixation portion 42, and a distal end side thereof extends in a direction perpendicularly away from the surface of the disk 1, in a similar manner to the first extension portion 23 of the return spring 21 according to the first embodiment. More specifically, a proximal end side of the first extension portion 43 extends in the disk axial direction, forming an erected portion 43A. Then, a portion across from an intermediate position thereof to the distal end side extends obliquely relative to the disk axial direction, more specifically, obliquely toward the torque receiving surface 4 of the mount member 2, forming an inclined portion 43B.

The second extension portion 44 is bent at an acute angle or a right angle (approximately 45 degrees to 90 degrees) from the distal end side of the first extension portion 43 outwardly in the disk radial direction toward the abutment plate portion 17 of the pad spring 11, and extends outwardly in the disk radial direction toward the abutment plate portion 17 of the pad spring 11, in a similar manner to the second extension portion 24 of the return spring 21 according to the first embodiment. The second extension portion 44 corresponds to the first portion extending from the inner side toward the outer side in the disk radial direction. In this case, the second extension portion 44 includes a proximal end portion 44A extending from the first extension portion 23 outwardly in the disk radial direction, an inclined portion 44B extending from the proximal end portion 44A obliquely relative to the direction in which the proximal end portion 44A extends, i.e., obliquely in a direction away from the torque receiving surface 4, and a distal end portion 44C extending from the inclined portion 44B in the same direction as the proximal end portion 44A.

The abutment portion 45 corresponds to the second portion extending by being bent from the distal end portion 44C of the second extension portion 44 in the disk axial direction. More specifically, the abutment portion 45 is substantially perpendicularly (70 to 90 degrees) bent from the distal end side (the distal end portion 44C) of the second extension portion 44 toward the abutment plate portion 17 of the pad spring 11, and extends inwardly in the disk axial direction toward the abutment plate portion 17 of the pad spring 11. Then, a distal end side of the abutment portion 45 is folded in a U-shape manner, forming a folded portion 45A. This folded portion 45A is in elastic abutment with the abutment plate portion 17 of the pad spring 11.

As illustrated in FIG. 18, the return spring 41 is formed in such a manner that the abutment portion 45 corresponding to the second portion has a width S1 narrower than a width S2 of the second extension portion 44 corresponding to the first portion. In this case, a part of a side surface of the abutment portion 45 is set as an inclined surface 45B where a width dimension of the abutment portion 45 is reducing as it is getting farther away from the second extension portion 44. This inclined surface 45B is formed on a side surface facing (opposite from) the guide plate portion 18 of the pad spring 11, and is inclined farther away from the guide plate portion 18 as it is getting farther away from the second extension portion 44. In other words, a proximal end side of the abutment portion 45 is configured in such a manner that the wider portion (the portion having the width S2) and the narrower portion (the portion having the width S2) are connected (continuously joined) via an inclined connection portion 45C having the inclined surface 45B.

The thus-configured second embodiment can improve the installability of the friction pad 6. More specifically, when the friction pad 6 with the spring structure 20 attached thereto as illustrated n FIG. 8 is installed on the mount member 2 with the pad spring 11 attached thereto, the distal end side of the return spring 21 may interfere with the guide plate portion 18. On the other hand, according to the second embodiment, the distal end side of the return spring 41, i.e., the abutment portion 45, which faces the guide plate portion 18 first at the time of the installation, has the width S1 smaller than the width S2 of the second extension portion 44. This dimensional arrangement can prevent the return spring 41 from interfering with the guide plate portion 18 (from being stuck with the guide plate portion 18), thereby improving the workability of installing the friction pad 6 (the installability).

Even reducing the width dimension S1 of the abutment portion 45 has almost no influence on a stress of the entire return spring 41 (there is almost no change in the stress of the return spring 41), because a stress of the distal end side of the return spring 41 is small. Further, the abutment portion 45 is in abutment with the abutment plate portion 17 of the pad spring 11 at a substantially light angle, and this is also a reason why reducing the width dimension S1 of the abutment portion 45 has little influence on the stress.

The second embodiment returns the friction pad 6 to the return position where the friction pad 6 is separated from the disk 1 by the return spring 41 as described above, and a basic operation thereof is not significantly different from the above-described first embodiment. Especially, according to the second embodiment, the return spring 41 is formed in such a manner that the width S1 of the abutment portion 45 is narrower than the width S2 of the second extension portion 44. Therefore, when the friction pad 6 is installed, it is possible to prevent the return spring 41 from interfering with the guide plate portion 18 (from contacting or being stuck with the guide plate portion 18), thereby improving the workability of installing the friction pad 6 (the installability). Further, on the proximal end side of the abutment portion 45, the wider portion (the portion having the width S2) and the narrower portion (the portion having the width S1) are connected (is continuously joined) via the inclined connection portion 45C including the inclined surface 45B. Therefore, when the friction pad 6 is installed, the return spring 41 can be smoothly guided along the guide plate portion 18 across from the abutment portion 45 of the return spring 41 to the second extension portion 44. This can also contribute to the improvement of the installability of the friction pad 6.

Figure 19:
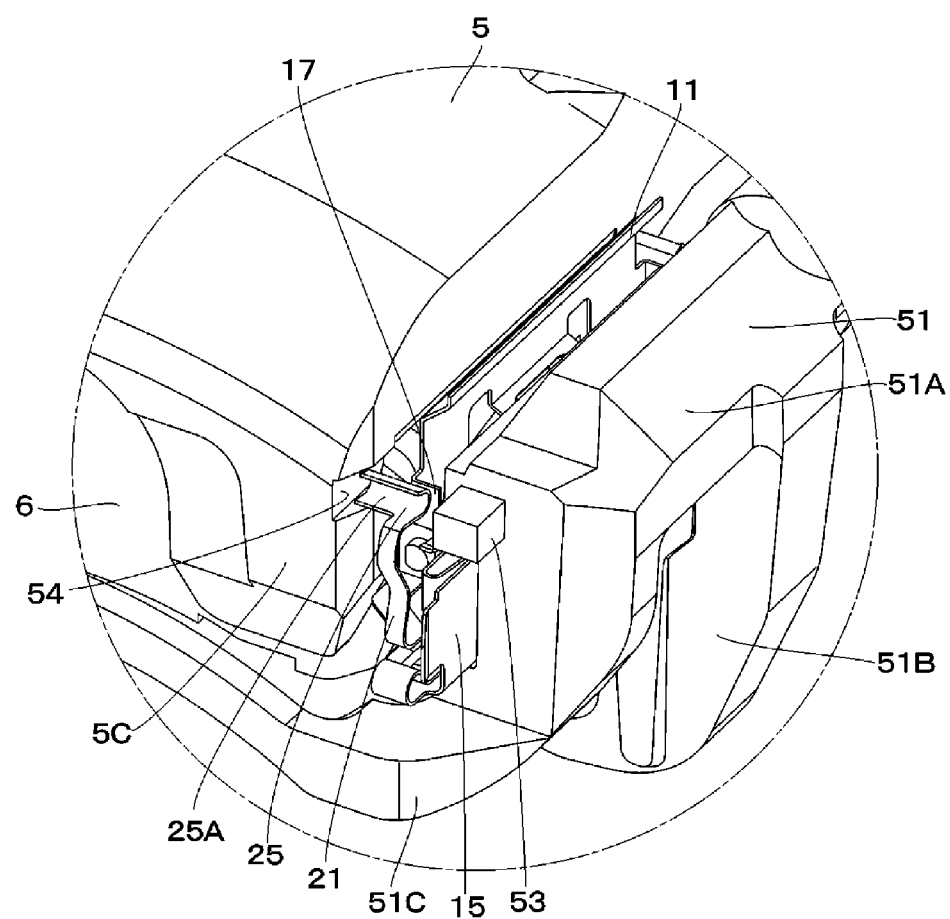
FIG. 19 is a perspective view of main parts of a disk brake according to a third embodiment as viewed from the outer side.
Figure 20:
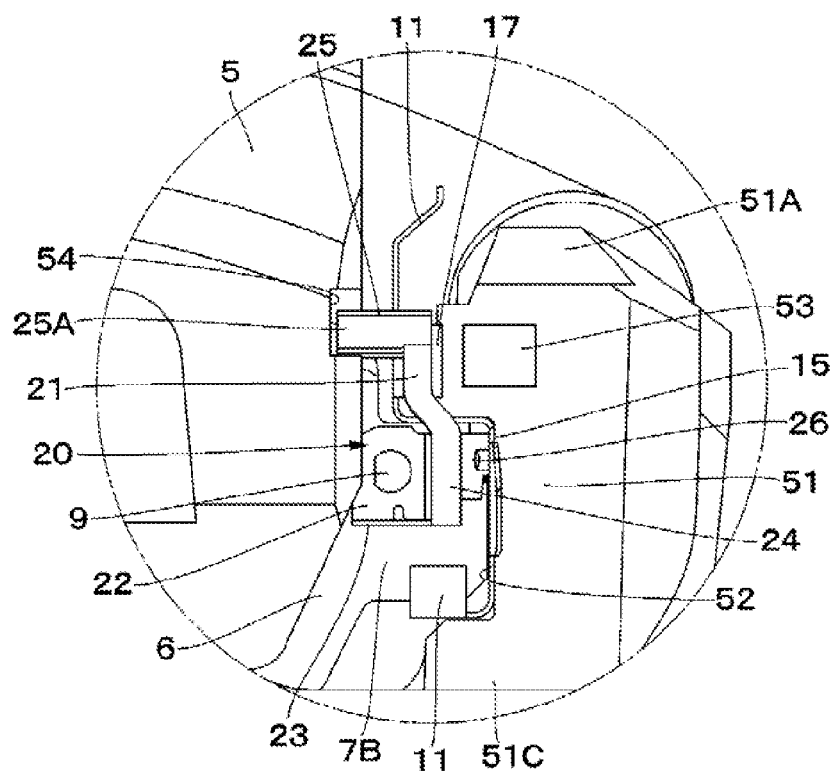
FIG. 20 is a front view of main parts of the disk brake according to the third embodiment as viewed from the same direction as FIG. 19.

Next, FIGS. 19 and 20 illustrate a third embodiment. The third embodiment is characterized in that it is configured in such a manner that a guide member is provided on a support member. The third embodiment will be described, identifying similar elements to the above-described first embodiment with same reference numerals, and omitting descriptions thereof.

A mount member 51 fixed to the non-rotatable portion of the vehicle includes a pair of arm portions 51A, a support portion 51B, and a reinforcement beam 51C in a similar manner to the mount member 2 according to the first embodiment. Further, pad guides 52, which guide the friction pads 6 in the disk axial direction, are formed on the mount member 51 in a similar manner to the first embodiment. According to the above-described first embodiment, the guide plate portion 18 serving as the guide portion is formed on the pad spring 11.

On the other hand, according to the third embodiment, a guide protrusion 53 serving as the guide portion is formed on the mount member 51.

More specifically, the guide protrusion 53 is formed so as to protrude in the disk axial direction at an outer position in the disk radial direction relative to the pad guide 52 on a side surface of the mount member 51 on the outer side. The guide protrusion 53 supports the side surface of the return spring 21, more specifically, the side surface of the second extension portion 24 or the side surface of the abutment portion 25 of the return spring 21 in a similar manner to the guide plate portion 18 according to the above-described first embodiment. This configuration allows the side surface (the side surface of the second extension portion 24 or the side surface of the abutment portion 25) of the return spring 21 to be supported (guided) by the guide protrusion 53 when the friction pad 6 is installed on the mount member 51, thereby succeeding in regulating the abutment position of the abutment portion 25 of the return spring 21 in such a manner that it is located at the abutment plate portion 17 of the pad spring 11 with the friction pad 6 already installed on the mount member 51.

The third embodiment supports (guides) the return spring 21 by the guide protrusion 53 as described above, and a basic operation thereof is not significantly different from the above-described first embodiment. Especially, according to the third embodiment, the provision of the guide protrusion 53 on the mount member 51 allows the guide plate portion 18 of the pad spring 11 to be omitted from the pad spring 11. Further, according to the third embodiment, the abutment plate portion 17 is formed as a flat surface (the distal end guide portion 17A is not formed unlike the first embodiment). In this case, the distal end side of the return spring 21, i.e., the folded portion 25A of the abutment portion 25 is formed so as to be wide in the disk rotational direction. According thereto, a limitation/prevention recess 54, which is recessed away from the abutment portion 25, is formed on a portion of the outer leg portion 5C of the caliper 5 that faces the abutment portion 25 (the folded portion 25A). The limitation/prevention recess 54 (a bottom surface thereof) limits or prevents a movement (displacement) of the abutment portion 25 (the folded portion 25A) toward the friction pad 6 (the central side of the friction pad 6) in the disk rotational direction. In other words, the third embodiment is configured to support (guide) the distal end side (the abutment portion 25) of the return spring 21 by the guide protrusion 53 (the side surface thereof) of the mount member 51 and the limitation/prevention recess 54 (the bottom surface thereof) of the caliper 5.

Figure 21:
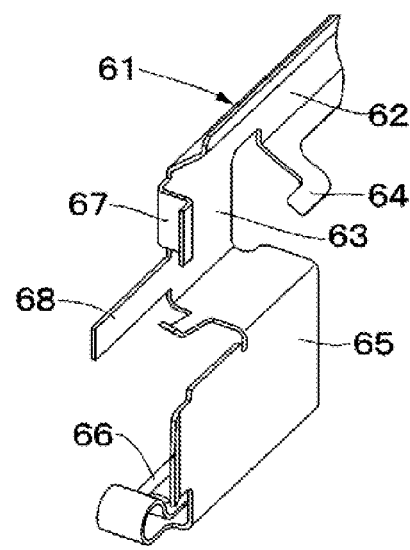
FIG. 21 is a perspective view of a half portion of a pad spring according to a fourth embodiment.

Next, FIG. 21 illustrates a fourth embodiment. The fourth embodiment is characterized in that it is configured in such a manner that the guide portion is provided at an inner position in the disk radial direction relative to the abutment plate portion of the pad spring. The fourth embodiment will be described, identifying similar elements to the above-described first embodiment with same reference numerals, and omitting descriptions thereof.

A pad spring 61 includes a connection plate portion 62, flat plate portions 63, an engagement plate portion 64, guide plate portions 65, radially biasing plate portions 66, abutment plate portions 67, and guide plate portions 68, which are integrally formed, in a similar manner to the pad spring 11 according to the first embodiment. The guide plate portion 68 as the guide portion employed in the fourth embodiment is used to replace the guide plate portion 18 according to the first embodiment. The guide plate portion 68 is formed at an inner position in the disk radial direction relative to the abutment plate portion 67.

In this case, the guide plate portion 68 linearly extends from the flat plate portion 63 in the direction away from the disk 1 in the disk axial direction.

The fourth embodiment supports (guides) the return spring 21 by the guide plate portion 68 as described above, and a basic operation thereof is not significantly different from the above-described first embodiment. Especially, according to the fourth embodiment, the guide plate portion 68 is configured to extend linearly, whereby the guide plate portions 68 can be prevented from being easily struck with one another, for example, when a plurality of pad springs 61 are conveyed together, compared to the guide plate portion 18 according to the first embodiment, i.e., the guide plate portion 18 formed into a substantially L shape or a one-fourth circular arc shape.

The above-described first embodiment has been described based on the example in which the return spring 21 or 41 is configured as a plate spring made of a metallic plate. However, the present invention is not limited thereto, and may use various kinds of springs such as a spring made of another material than a metallic plate (for example, a resin material), and a wire spring made of another material than a plate material (for example, a wire material) as the return spring. The same applies to the other embodiments and the modification.

The above-described first embodiment has been described based on the example in which the recessed pad guides 3 are formed on the arm portions 2A of the mount member 2, and the ear portions 7B and 7C serving as the fitting portions of the back plates 7 are formed protrudingly. However, the present invention is not limited thereto, and may be configured in such a manner that, for example, recessed fitting portions are formed on the back plates of the friction pads, and protruding pad guides are formed on the arm portions of the mount member. The same applies to the other embodiments and the modification.

The above-described first embodiment has been described based on the example that uses the so-called integral pad spring 11 including the respective guide plate portions 15, the radially biasing plate portions 16, and the like on the inner side and the outer side of the disk 1. However, the present invention is not limited thereto, and may be configured to include, for example, two pad springs shaped as if the pad spring is separated into pieces on the inner side and the outer side of the disk, and dispose them on the inner side and the outer side of the disk, respectively. The same applies to the other embodiments and the modification.

The above-described first embodiment has been described based on the example in which the single piston 5D is provided in the inner leg portion 5A of the caliper 5. However, the present invention is not limited thereto, and may have, for example, a twin-bore configuration including two pistons in the inner leg portion of the caliper, or a configuration including three or more pistons in the inner leg portion of the caliper. The same applies to the other embodiments and the modification.

The above-described first embodiment has been described based on the example of a so-called floating caliper type disk brake configured in such a manner that the piston 5 is slidably provided in the inner leg portion 5A of the caliper 5 via the cylinder, and the outer leg portion 5C of the caliper 5 is placed into abutment with the outer-side friction pad 6. However, the present invention is not limited thereto, and may be employed for, for example, a so-called opposed piston type disk brake configured in such a manner that pistons are provided on the inner side and the outer side of the caliper, respectively. The same applies to the other embodiments and the modification.

According to the above-described embodiments, the return spring is configured in such a manner that the distal end side of the return spring is in elastic abutment with the mount member side on the outer side in the disk radial direction relative to the proximal end side of the return spring fixed to the back plate of the friction pad. Therefore, the moment is applied to the portion where the proximal end side of the return spring and the back plate of the friction pad are fixed to each other in the direction for separating the outer side of the friction pad in the disk radial direction from the disk based on the abutment between the distal end side and the mount member side, which is made on the outer side in the disk radial direction relative to the proximal end side. Therefore, the friction pad tends to have such a posture at the return position that the outer side of the friction pad in the disk radial direction is inclined farther away from the disk than the inner side of the friction pad in the disk radial direction, whereby it is possible to reduce a drag between the outer side of the friction pad in the disk radial direction and the disk. Further, according thereto, it is also possible to prevent the lining of the friction pad from being unevenly worn.

Further, the guide portion, which supports the side surface of the return spring (the intermediate portion), is formed on the pad spring or the like. Therefore, it is possible to regulate the position where the distal end side of the return spring is in abutment with the mount member side in such a manner that it is located at a desired position by the guide portion of the pad spring or the like. In other words, it is possible to prevent the distal end side of the return spring from being offset form the desired abutment position (prevent the return spring from being incompletely installed) when the disk brake is assembled. Further, even when the distal end side of the return spring tends to be offset from the desired abutment position due to, for example, application of an external force to the return spring, the side surface of the return spring (the intermediate portion) is supported by the guide portion of the pad spring or the like, whereby this offset can be prevented. For example, even when a flying stone or the like hits the return spring when the vehicle is running on an unpaved road or the like, the side surface of the return spring (the intermediate portion) is in abutment with the guide portion, whereby it is possible to prevent the return spring from being deformed more than that (a positional offset of the distal end side).

Further, since it is possible to regulate the distal end side of the return spring in such a manner that it is located at the described abutment position, it becomes possible to reduce the sizes of the distal end side of the return spring and the portion of the mount member side which the distal end side is in abutment with (miniaturize them). As a result, it is possible to improve the flexibility of the layout of the return spring. For example, even when only a narrow available gap (space) is generated between the mount member and the caliper due to a size reduction of the disk brake, the return spring 21 can be installed in this narrow gap.

According to one of the embodiments of the present invention, the return spring includes the first portion extending outwardly from the inner side in the disk radial direction, and the second portion extending while being bent from the first portion in the disk axial direction, and is formed in such a manner that the width of the second portion is narrower than the width of the first portion. Therefore, when the friction pad is installed, it is possible to prevent the return spring and the guide portion from interfering with each other (being stuck to each other), and therefore it is possible to improve the workability of installing the friction pad (the installability).

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2013-136627 filed on Jun. 28, 2013 and No. 2014-060595 filed on Mar. 24, 2014. The entire disclosures of No. 2013-136627 filed on Jun. 28, 2013 and No. 2014-060595 filed on Mar. 24, 2014 including specification, claims, drawings and summary are incorporated herein by reference in its entirety.

What is claimed is:

1. A disk brake comprising:
    a mount member configured to be fixed to a non-rotatable portion of a vehicle, and formed so as to extend over an outer circumferential side of a disk;
    a caliper disposed on the mount member so as to be movable in an axial direction of the disk;
    a pair of friction pads movably provided on the mount member and configured to be pressed against both surfaces of the disk by the caliper;
    a pad spring provided on the mount member and disposed between the mount member and the pair of friction pads; and
    a return spring disposed between the friction pad and the mount member and configured to bias the friction pad in a return direction for separating the friction pad from the disk,
    wherein the return spring includes a proximal end side portion and a distal end side portion, and the return spring is configured in such a manner that the proximal end side portion is fixed to a back plate of the friction pad and the distal end side portion is in elastic abutment with the mount member side on an outer side in a disk radial direction relative to the proximal end side portion,
    wherein the pad spring has a guide portion extending in a direction away from the disk in the disk axial direction and curves or vents inwardly in the disk radial direction as it gets farther away from the disk, and
    wherein a part of the guide portion is provided on a central side of the friction pad in the disk circumferential direction on the intermediate portion of the return spring.

2. The disk brake according to claim 1, wherein the guide portion limits or prevents a movement of the return spring toward the friction pad.

3. The disk brake according to claim 1, wherein the return spring includes a first portion extending outwardly from an inner side in the disk radial direction, and a second portion extending from the first portion while being bent in the axial direction of the disk, and
    wherein the return spring is formed in such a manner that a width of the second portion is narrower than a width of the first portion.

4. The disk brake according to claim 3, wherein the return spring is formed in such a manner that the first portion and the second portion are connected by an inclined surface formed on a side surface facing the guide portion, the inclined surface being inclined farther away from the guide portion as it gets farther away from the first portion.

5. The disk brake according to claim 1, wherein the guide portion of the pad spring extends from an outer side in the disk radial direction relative to the distal end side portion.

6. The disk brake according to claim 1, wherein the guide portion of the pad spring extends to an inner side in the disk radial direction relative to the distal end side portion.

7. The disk brake according to claim 1, wherein the guide portion of the pad spring includes a bent portion formed at a position of the guide portion away from the disk in the disk axial direction, the bent portion being bent and extended toward the central side of the friction pad.

8. A disk brake comprising:
a mount member configured to be fixed to a non-rotatable portion of a vehicle, and formed so as to extend over an outer circumferential side of a disk;
a caliper disposed on the mount member so as to be movable in an axial direction of the disk; a pair of friction pads movably provided on the mount member and configured to be pressed against both surfaces of the disk by the caliper;
a pad spring provided on the mount member and disposed between the mount member and the pair of friction pads; and
a return spring disposed between the friction pad and the mount member and configured to bias the friction pad in a return direction for separating the friction pad from the disk,
wherein the return spring includes a proximal end side portion and a distal end side portion, and the return spring is configured in such a manner that the proximal end side portion is fixed to a back plate of the friction pad and the distal end side portion is in elastic abutment with the mount member side on an outer side in a disk radial direction relative to the proximal end side portion,
wherein the pad spring includes a guide portion being made of a plate extending in the disk radial direction, and
wherein the guide portion is disposed so that the guide portion can abut against the return spring at an inner side in the disk radial direction relative to the distal end side portion.

9. The disk brake according to claim 8, wherein the guide portion limits or prevents a movement of the return spring toward the friction pad.

10. The disk brake according to claim 8, wherein the return spring includes a first portion extending outwardly from an inner side in the disk radial direction, and a second portion extending from the first portion while being bent in the axial direction of the disk, and
wherein the return spring is formed in such a manner that a width of the second portion is narrower than a width of the first portion.

11. The disk brake according to claim 10, wherein the return spring is formed in such a manner that the first portion and the second portion are connected by an inclined surface formed on a side surface facing the guide portion, the inclined surface being inclined farther away from the guide portion as it gets farther away from the first portion.

12. The disk brake according to claim 8, wherein the guide portion of the pad spring extends from an outer side in the disk radial direction relative to the distal end side portion.

13. The disk brake according to claim 8, wherein the guide portion of the pad spring extends to an inner side in the disk radial direction relative to the distal end side portion.

14. The disk brake according to claim 8, wherein the guide portion of the pad spring includes a bent portion formed at a position of the guide portion away from the disk in the disk axial direction, the bent portion being bent and extended toward the central side of the friction pad.

15. A disk brake comprising:
a mount member configured to be fixed to a non-rotatable portion of a vehicle, and formed so as to extend over an outer circumferential side of a disk;
a caliper disposed on the mount member so as to be movable in an axial direction of the disk;
a pair of friction pads movably provided on the mount member and configured to be pressed against both surfaces of the disk by the caliper;
a pad spring provided on the mount member and disposed between the mount member and the pair of friction pads; and
a return spring disposed between the friction pad and the mount member and configured to bias the friction pad in a return direction for separating the friction pad from the disk; and
a guide portion supporting a side surface of the return spring,
wherein the return spring includes a proximal end side portion and a distal end side portion, and the return spring is configured in such a manner that the proximal end side portion is fixed to a back plate of the friction pad and the distal end side portion is in elastic abutment with the mount member side on an outer side in a disk radial direction relative to the proximal end side portion,
wherein the return spring includes a first portion extending outwardly from an inner side in the disk radial direction, and a second portion extending from the first portion while being bent in the axial direction of the disk, and
wherein the first portion and the second portion are connected by an inclined surface formed on a side surface facing the guide portion, the inclined surface being inclined farther away from the guide portion as it gets farther away from the first portion.

16. The disk brake according to claim 15, wherein the guide portion limits or prevents a movement of the return spring toward the friction pad.

17. The disk brake according to claim 15, wherein the guide portion of the pad spring extends from an outer side in the disk radial direction relative to the distal end side portion.

18. The disk brake according to claim 15, wherein the guide portion of the pad spring extends to an inner side in the disk radial direction relative to the distal end side portion.

19. The disk brake according to claim 15, wherein the guide portion of the pad spring includes a bent portion formed at a position of the guide portion away from the disk in the disk axial direction, the bent portion being bent and extended toward the central side of the friction pad.

* * * * *